(12) United States Patent
Nakasako

(10) Patent No.: US 9,403,439 B2
(45) Date of Patent: Aug. 2, 2016

(54) POWER GENERATION CONTROL DEVICE

(71) Applicant: HONDA MOTOR CO., LTD., Tokyo (JP)

(72) Inventor: Toru Nakasako, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/434,869

(22) PCT Filed: Oct. 11, 2013

(86) PCT No.: PCT/JP2013/077726
§ 371 (c)(1),
(2) Date: Apr. 10, 2015

(87) PCT Pub. No.: WO2014/058045
PCT Pub. Date: Apr. 17, 2014

(65) Prior Publication Data
US 2015/0274022 A1    Oct. 1, 2015

(30) Foreign Application Priority Data

Oct. 11, 2012  (JP) ................................. 2012-225689
Oct. 11, 2012  (JP) ................................. 2012-225691

(51) Int. Cl.
*F02N 11/06* (2006.01)
*H02P 9/04* (2006.01)
(Continued)

(52) U.S. Cl.
CPC ................. *B60L 11/12* (2013.01); *B60L 1/003* (2013.01); *B60L 1/06* (2013.01); *B60L 3/0046* (2013.01);
(Continued)

(58) Field of Classification Search
USPC .......................................... 290/40 R; 701/22
See application file for complete search history.

(56) References Cited

U.S. PATENT DOCUMENTS 5,495,912 A * 3/1996 Gray, Jr. ................... B60K 6/12
                                                    180/165
5,924,406 A * 7/1999 Kinugasa ........... B60H 1/00771
                                                    123/436

(Continued)

FOREIGN PATENT DOCUMENTS

JP    09-224304 A    8/1997
JP    10-84636 A     3/1998

(Continued)

OTHER PUBLICATIONS

Notification of Reasons for Refusal dated Oct. 27, 2015, issued in counterpart Japanese Patent Application No. 2014-540901 (7 pages).

(Continued)

*Primary Examiner* — Pedro J Cuevas
(74) *Attorney, Agent, or Firm* — Westerman, Hattori, Daniels & Adrian, LLP

(57) ABSTRACT

The purpose of the present invention is to improve the operation efficiency of an internal combustion engine while supplying a required drive force for an electric motor. A power generation control device determines the appropriateness of power generation by a power generator in accordance with the state of a storage battery, and when allowing power generation, sets the amount of power generation equivalent to an output required for cruising in accordance with a travelling state, while setting an additional amount of power generation in accordance with the amount of power required depending on a vehicle state and the traveling state.

16 Claims, 14 Drawing Sheets

(51) Int. Cl.
*B60L 11/12* (2006.01)
*B60L 1/00* (2006.01)
*B60L 1/06* (2006.01)
*B60L 3/00* (2006.01)
*B60L 11/14* (2006.01)
*B60L 11/18* (2006.01)
*B60L 15/20* (2006.01)
*B60L 9/00* (2006.01)
*B60W 20/00* (2016.01)

(52) U.S. Cl.
CPC .............. *B60L 11/123* (2013.01); *B60L 11/14* (2013.01); *B60L 11/1816* (2013.01); *B60L 11/1859* (2013.01); *B60L 11/1861* (2013.01); *B60L 11/1868* (2013.01); *B60L 15/2009* (2013.01); *H02P 9/04* (2013.01); *B60L 2240/12* (2013.01); *B60L 2240/34* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2260/44* (2013.01)

(56) References Cited

U.S. PATENT DOCUMENTS

| | | | | |
|---|---|---|---|---|
| 6,208,931 | B1* | 3/2001 | Schoettle | B60K 25/00 290/40 C |
| 6,326,702 | B1 | 12/2001 | Yonekura et al. | |
| 6,330,498 | B2* | 12/2001 | Tamagawa | B60L 11/00 180/65.26 |
| 6,366,838 | B1* | 4/2002 | Yoshino | B60K 6/442 318/139 |
| 6,625,525 | B2* | 9/2003 | Yoshino | B60K 6/442 180/65.23 |
| 6,889,126 | B2* | 5/2005 | Komiyama | B60K 6/445 180/65.235 |
| 6,908,162 | B2* | 6/2005 | Obayashi | B60L 7/26 303/152 |
| 6,994,360 | B2* | 2/2006 | Kuang | B60K 6/445 180/65.235 |
| 7,104,347 | B2* | 9/2006 | Severinsky | B60H 1/004 180/65.23 |
| 7,117,964 | B1* | 10/2006 | Kuang | B60K 6/365 180/65.22 |
| 7,398,147 | B2* | 7/2008 | Kozarekar | B60K 6/445 180/65.28 |
| 7,420,292 | B2* | 9/2008 | Busdiecker | H02J 1/14 307/10.1 |
| 7,696,719 | B2* | 4/2010 | Yamaguchi | B60W 10/06 104/34 |
| 7,710,068 | B2* | 5/2010 | Tani | H02J 1/14 290/40 C |
| 7,812,469 | B2* | 10/2010 | Asada | F02D 41/083 290/40 A |
| 7,863,769 | B2* | 1/2011 | Busdiecker | H02J 1/14 307/10.1 |
| 8,118,121 | B2* | 2/2012 | Vargas | B60K 1/04 180/65.24 |
| 8,246,499 | B2* | 8/2012 | Iwanaka | B60K 6/40 475/5 |
| 8,359,133 | B2* | 1/2013 | Yu | B60K 6/445 701/22 |
| 8,473,132 | B2* | 6/2013 | Ichikawa | B60K 6/445 180/65.25 |
| 8,473,133 | B2* | 6/2013 | Wang | B60W 10/06 180/65.265 |
| 8,525,474 | B2* | 9/2013 | Chen | B60L 11/12 180/65.1 |
| 8,583,301 | B2* | 11/2013 | Okubo | B60K 6/445 180/65.1 |
| 8,612,107 | B2* | 12/2013 | Malikopoulos | B60W 30/1882 701/101 |
| 8,897,943 | B2* | 11/2014 | Sheidler | A01D 41/12 701/110 |
| 8,922,035 | B2* | 12/2014 | Matsuda | B62M 23/02 290/40 C |
| 8,948,964 | B2* | 2/2015 | Pan | B60H 1/3208 701/110 |
| 9,008,878 | B2* | 4/2015 | Akashi | B60W 20/10 701/22 |
| 2001/0039230 | A1* | 11/2001 | Severinsky | B60H 1/004 477/3 |
| 2002/0107618 | A1* | 8/2002 | Deguchi | B60K 6/442 701/22 |
| 2003/0162631 | A1* | 8/2003 | Williams | B60K 6/38 477/5 |
| 2004/0093149 | A1* | 5/2004 | Hara | B60H 1/00885 701/104 |
| 2004/0117078 | A1* | 6/2004 | Corcione | B60K 6/48 701/22 |
| 2004/0239181 | A1* | 12/2004 | Obayashi | B60L 7/26 303/152 |
| 2004/0254695 | A1* | 12/2004 | Komiyama | B60K 6/445 701/22 |
| 2007/0029800 | A1 | 2/2007 | Yamashita et al. | |
| 2007/0213921 | A1* | 9/2007 | Yamaguchi | B60W 10/06 701/115 |
| 2008/0157539 | A1* | 7/2008 | Tani | H02J 1/14 290/40 C |
| 2008/0207374 | A1* | 8/2008 | Iwanaka | B60K 6/40 475/5 |
| 2008/0319595 | A1* | 12/2008 | Yamamoto | B60L 15/2045 701/22 |
| 2009/0210108 | A1* | 8/2009 | Okubo | B60K 6/445 701/22 |
| 2011/0166731 | A1* | 7/2011 | Kristinsson | B60W 10/08 701/22 |
| 2011/0172867 | A1* | 7/2011 | Yu | B60K 6/445 701/22 |
| 2012/0253576 | A1 | 10/2012 | Tamagawa | |
| 2012/0271492 | A1* | 10/2012 | Wang | B60W 10/06 701/22 |
| 2013/0131900 | A1* | 5/2013 | Yu | B60K 6/445 701/22 |
| 2013/0131919 | A1* | 5/2013 | Pan | B60H 1/3208 701/36 |
| 2014/0172207 | A1* | 6/2014 | Akashi | B60W 10/06 701/22 |
| 2014/0277879 | A1* | 9/2014 | Sheidler | A01D 41/12 701/22 |
| 2015/0046007 | A1* | 2/2015 | Wakashiro | B60K 6/46 701/22 |
| 2015/0046010 | A1* | 2/2015 | Wakashiro | B60K 6/46 701/22 |
| 2015/0112522 | A1* | 4/2015 | Liang | B60W 10/06 701/22 |
| 2015/0158481 | A1* | 6/2015 | Tagawa | B60W 10/10 701/22 |
| 2015/0306968 | A1* | 10/2015 | Ohira | H02J 7/0027 307/24 |
| 2016/0108832 | A1* | 4/2016 | Kumagai | B60K 6/445 701/22 |

FOREIGN PATENT DOCUMENTS

| | | |
|---|---|---|
| JP | 2000-186590 A | 7/2000 |
| JP | 2002-235575 A | 8/2002 |
| JP | 2006-172931 A | 6/2006 |
| JP | 2007-049780 A | 2/2007 |
| JP | 2009-280010 A | 12/2009 |
| WO | 2011/078189 A1 | 6/2011 |

OTHER PUBLICATIONS

International Search Report dated Nov. 26, 2013, issued in corresponding application No. PCT/JP2013/077726.

* cited by examiner

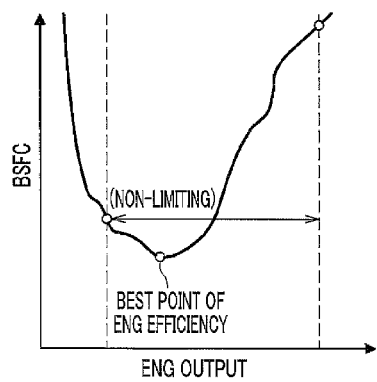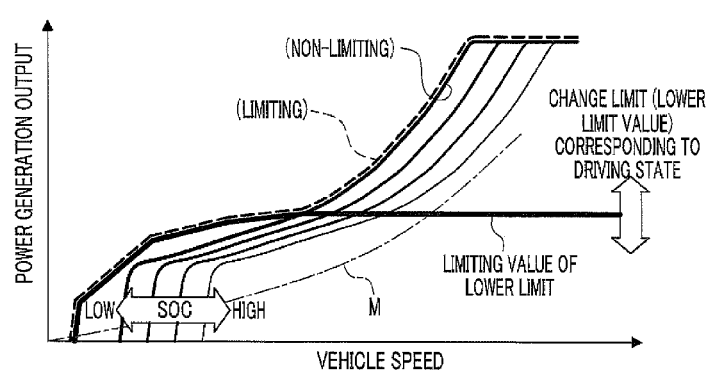

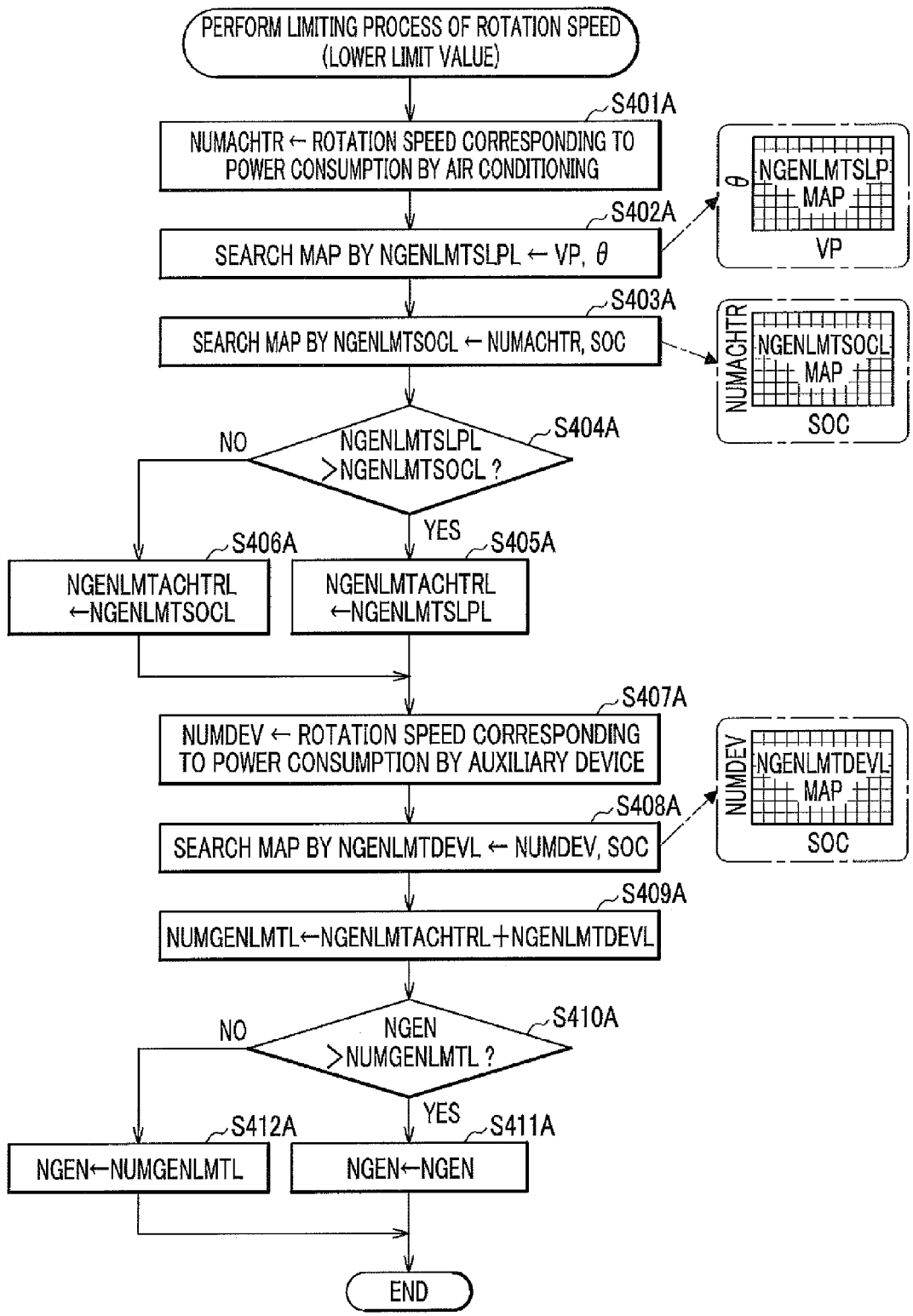

POWER GENERATION CONTROL DEVICE

TECHNICAL FIELD

The present invention relates to a power generation control device, and particularly relates to a power generation control device including a power generator driven by an internal combustion engine, a storage battery for storing electric power generated by the power generator, and a controller for controlling the internal combustion engine and the power generator.

BACKGROUND ART

Patent Literature 1 (WO2011/078189) discloses a hybrid vehicle capable of driving in either an EV driving mode that drives an electrical motor only by electric power of a storage battery or a series drive mode that drives an electrical motor by electric power generated by a power generator with movement power of an internal combustion engine (see claim 1). Further, Patent Literature 1 discloses controlling in such a manner as to derive a required driving force of the electrical motor, based on the vehicle speed and the accelerator pedal open degree, make determination of a start of the internal combustion engine and determine the power generation amount of the power generator, from the required driving force and the state of the storage battery, thus making the vehicle in the EV driving mode or in the series driving mode (see claim 1 and FIG. 4).

Patent Literature 2 (JP 09-224304 A) discloses a hybrid vehicle that has movement power sources of two systems, which are an internal combustion engine and an electrical motor, and appropriately selects driving only the electrical motor, driving only the internal combustion engine, or simultaneous driving of the electrical motor and the internal combustion engine (see claim 2). Also, disclosed is that the internal combustion engine is driven at a constant rotation speed at the best fuel economy point, and a battery is charged by generating power with an output surplus of the internal combustion engine during driving only the internal combustion engine (see claim 2 and see FIG. 3).

BACKGROUND ART DOCUMENT

Patent Literature

Patent Literature 1: WO2011/078189
Patent Literature 2: JP 09-224304 A

DISCLOSURE OF THE INVENTION

Problem to be Solved by the Invention

As the capacity and the output of a storage battery becomes large, accompanying development of energy storage systems such as a storage battery, a series type hybrid vehicle basically drives in EV driving, in which electric power stored in a storage battery is supplied to an electrical motor, and the frequency of using an internal combustion engine and a power generator decreases, wherein the internal combustion engine and the power generator are used when the remaining storage amount of the storage battery drops. Accordingly, as a power generator mounted on a series type hybrid vehicle, which basically drives in EV driving, it is desirable to use a power generator that is small and light as much as possible. Further, as an internal combustion engine driving the power generator, it is desirable to use one that is small and light with a reduced displacement. By using a power generator and an internal combustion engine, which are small and light, the weight of a vehicle can be reduced, and it is possible to improve the cruising distance that enables driving, for example, only with electric power stored in a storage battery without consuming fuel.

In the technology disclosed by Patent Literature 1 (WO2011/078189), a so-called 'required-output following type control' is performed, wherein a start of an internal combustion engine is determined and the amount of power generation of the power generator and the rotation speed of the internal combustion engine are determined, from the required driving force and the state of the storage battery.

However, a series type hybrid vehicle having an internal combustion engine with a small displacement (a power generator with a low output), the rotation speed of the internal combustion engine driving the power generator increases more if the required power generation amount of the power generator is larger compared with a case of a conventional series type hybrid vehicle having an internal combustion engine with a comparatively large displacement, and deviation from the best fuel economy point of the internal combustion engine tends to occur. Accordingly, there is a problem that the fuel economy during series driving drops. Further, if the rotation speed of the internal combustion engine increases, sounds and vibration generated by the internal combustion engine also become significant, and the merchantability of the hybrid vehicle possibly falls.

In the technology disclosed by Patent Literature 2 (JP 09-224304 A), a so-called 'constant point operation type control' is performed, wherein the internal combustion engine is operated at a constant rotation speed at the fuel economy best point thereof.

However, a series type hybrid vehicle having an internal combustion engine with a small displacement (and a power generator with a low output), the power generation amount of the power generator during operation of the internal combustion engine at a constant rotation speed at the fuel economic best point of it becomes smaller, compared with a case of a conventional series type hybrid vehicle having an internal combustion engine with a comparatively large displacement. Accordingly, when the required driving force of the electrical motor is large, the supplied electric power is insufficient only with the power generation amount of the power generator, and accordingly, the electrical motor is to be driven by both the electric power generated by the power generator and the electric power stored in the storage battery. Thus, the storage battery tends to discharge, and maintenance of energy possibly becomes difficult.

A so-called 'cruising output following type control' is presented, which changes the power generation amount during series driving, corresponding to the vehicle speed. Cruising output following type control is output control to set the power generation amount of a power generator and the rotation speed of an internal combustion engine for a vehicle speed. Accordingly, there is an advantage that the noises of the wind roar, road noise, and the like accompanying a rise in the vehicle speed and the driving sound of the internal combustion engine associate with each other, which improves the merchantability. Further, even though the driving load varies, the energy budget balance can be attained.

However, the power generation output instructed by a cruising output following type control does not target a high engine efficiency region (near the best fuel economy point). Consequently, depending on the driving pattern, it is possible that the fuel economy drops by continuing power generation at a point deviating from the best furl economy point of the internal combustion engine.

Further, by cruising output following type control in a case that the cruising speed of a vehicle is lower than or equal to the vehicle speed at the start of power generation, for example, if a load that is not related to the state of the driving load, such as that of an air conditioner or a heater, is operated, power generation is not started at the vehicle speed until the storage state of a storage battery becomes lower than or equal to a predetermined value. If continuous high load operation is necessary when the storage state of such a storage battery has dropped, a problem may occur that the energy budget balance cannot be made by a low output power generator (and an internal combustion engine with a small displacement).

In this situation, an object of the present invention is to provide a power generation control device capable of improving the operation efficiency of an internal combustion engine while satisfying the required driving force of an electrical motor.

Means for Solving the Problem

As means for solving the problems, in an aspect of the invention (an aspect according to claim 1), a power generation control device includes: a power generator driven by an internal combustion engine; a storage battery for storing electric power generated by the power generator; and a controller for controlling the internal combustion engine and the power generator, wherein the controller is arranged such that: the controller determines whether or not to permit the power generator to generate power, depending on a state of the storage battery; if the controller permits power generation, then the controller sets a power generation amount that corresponds to an output that is necessary, for cruising, corresponding to a driving state, and sets an add-on power generation amount that corresponds to an electric power amount that is necessary corresponding to a vehicle state and the driving state; if total of the power generation amount and the add-on power generation amount is higher than a maximum power generation amount, the controller controls the internal combustion engine and the power generator, based on the maximum power generation amount; and if the total of the power generation amount and the add-on power generation amount is lower than or equal to the maximum power generation amount, the controller controls the internal combustion engine and the power generator, based on the total of the power generation amount and the add-on power generation amount.

By such a power generation control device, as the power generation amount of the power generator can be limited by the maximum power generation amount, it is possible to operate the internal combustion engine driving the power generator, in a region higher than or equal to a certain efficiency including the best efficiency point of the internal combustion engine, which enables improvement in the fuel economy.

Further, as means for solving the problems, in another aspect of the invention (an aspect according to claim 9), a power generation control device includes: a power generator driven by an internal combustion engine; a storage battery for storing electric power generated by the power generator; and a controller for controlling the internal combustion engine and the power generator, wherein the controller is arranged such that: the controller determines whether or not to permit the power generator to generate power, depending on a state of the storage battery; if the controller permits power generation, then the controller sets a rotation speed of the internal combustion engine that enables the power generator to generate power that corresponds to an output that is necessary, for cruising, corresponding to a driving state, and sets an add-on rotation speed of the internal combustion engine to enable the power generator to generate power corresponding to an electric power amount that is necessary corresponding to a vehicle state and the driving state; if total of the rotation speed of the internal combustion engine and the add-on rotation speed of the internal combustion engine is higher than a maximum rotation speed of the internal combustion engine, the controller controls the internal combustion engine and the power generator, based on the maximum rotation speed of the internal combustion engine; and if the total of the rotation speed of the internal combustion engine and the add-on rotation speed of the internal combustion engine is lower than or equal to the maximum rotation speed of the internal combustion engine, the controller controls the internal combustion engine and the power generator, based on the rotation speed of the internal combustion engine and the add-on rotation speed of the internal combustion engine.

By such a power generation control device, as the rotation speed, which is the output of the internal combustion engine driving the power generator, can be limited by the maximum rotation speed of the internal combustion engine, it is possible to operate the internal combustion engine in a region higher than or equal to a certain efficiency including the best efficiency point of the internal combustion engine, which enables improvement in the fuel economy.

Still further, the power generation control device is preferably arranged such that the controller derives the maximum power generation amount or the maximum rotation speed of the internal combustion engine, based on a remaining capacity of the storage battery.

By such a power generation control device, as the maximum power generation amount or the maximum rotation speed of the internal combustion engine can be derived, based on the remaining capacity of the storage battery, it is possible to appropriately set the maximum power generation amount or the maximum rotation speed of the internal combustion engine, and thereby prevent over discharge of the storage battery, while satisfying the required driving force of the electrical motor, even with a power generator or internal combustion engine with a low output.

Still further, the power generation control device is preferably arranged such that the controller derives the maximum power generation amount or the maximum rotation speed of the internal combustion engine, based on an estimated gradient value of a road surface.

By such a power generation control device, as the maximum power generation amount or the maximum rotation speed of the internal combustion engine can be derived, based on the estimated gradient value of a road surface, it is possible to appropriately set the maximum power generation amount or the maximum rotation speed of the internal combustion engine, and thereby prevent over discharge of the storage battery, while satisfying the required driving force of the electrical motor, even with a power generator or internal combustion engine with a low output.

Yet further, the power generation control device is preferably arranged such as to include: temperature adjusting means operated by electric power from the storage battery, wherein the controller derives the maximum power generation amount or the maximum rotation speed of the internal combustion engine, corresponding to an operation state of the temperature adjusting means.

By such a power generation control device, as the maximum power generation amount or the maximum rotation speed of the internal combustion engine can be derived, based on the state of an electric power consuming device, the state being little dependent on the driving state (for example, vehicle speed) of the vehicle, it is possible to appropriately set the maximum power generation amount or the maximum rotation speed of the internal combustion engine, and thereby prevent over discharge of the storage battery, while satisfying the required driving force of the electrical motor, even with a power generator or internal combustion engine with a low output.

Further, as means for solving the problems, in another aspect of the invention (an aspect according to claim 5), a power generation control device includes: a power generator driven by an internal combustion engine; a storage battery for storing electric power generated by the power generator; and a controller for controlling the internal combustion engine and the power generator, wherein the controller is arranged such that: the controller determines whether or not to permit the power generator to generate power, depending on a state of the storage battery; if the controller permits power generation, then the controller sets a power generation amount that corresponds to an output that is necessary, for cruising, corresponding to a driving state, and sets an add-on power generation amount that corresponds to an electric power amount that is necessary corresponding to a vehicle state and the driving state; if total of the power generation amount and the add-on power generation amount is lower than a minimum power generation amount, the controller controls the internal combustion engine and the power generator, based on the minimum power generation amount; and if the total of the power generation amount and the add-on power generation amount is higher than or equal to the minimum power generation amount, the controller controls the internal combustion engine and the power generator, based on the total of the power generation amount and the add-on power generation amount.

By such a power generation control device, as the power generation amount of the electrical motor can be limited by the minimum power generation amount, it is possible to attain a system robust against a rapid change in the driving load even with a power generator and internal combustion engine with a low output, which enables maintaining the energy budget. Thus, it is possible to satisfy the required driving force of the electrical motor driven by electric power from the storage battery and/or the power generator. Further, over discharge of the storage battery can be prevented.

Still further, in another aspect of the invention (an aspect according to claim 13), a power generation control device includes: a power generator driven by an internal combustion engine; a storage battery for storing electric power generated by the power generator; and a controller for controlling the internal combustion engine and the power generator, wherein the controller is arranged such that: the controller determines whether or not to permit the power generator to generate power, depending on a state of the storage battery; if the controller permits power generation, then the controller sets a rotation speed of the internal combustion engine that enables the power generator to generate power corresponding to an output that is necessary, for cruising, corresponding to a driving state, and sets an add-on rotation speed of the internal combustion engine that enables the power generator to generate power that corresponds to an electric power amount that is necessary corresponding to a vehicle state and the driving state. if the total of the rotation speed of the internal combustion engine and the add-on rotation speed of the internal combustion engine is lower than a minimum rotation speed of the internal combustion engine, the controller controls the internal combustion engine and the power generator, based on the minimum rotation speed of the internal combustion engine; and if the total of the rotation speed of the internal combustion engine and the add-on rotation speed of the internal combustion engine is higher than or equal to the minimum rotation speed of the internal combustion engine, the controller controls the internal combustion engine and the power generator, based on the rotation speed of the internal combustion engine and the add-on rotation speed of the internal combustion engine.

By such a power generation control device, as the rotation speed, which is the output of the internal combustion engine driving the electrical motor, can be limited by the minimum rotation speed of the internal combustion engine, it is possible to attain a system robust against a rapid change in the driving load even with a power generator and internal combustion engine with a low output, which enables maintaining the energy budget. Thus, it is possible to satisfy the required driving force of the electrical motor driven by electric power from the storage battery and/or the power generator. Further, over discharge of the storage battery can be prevented.

Yet further, the power generation control device is preferably arranged such that the controller derives the minimum power generation amount or the minimum rotation speed of the internal combustion engine, based on a remaining capacity of the storage battery.

By such a power generation control device, as the minimum power generation amount or the minimum rotation speed of the internal combustion engine can be derived, based on the remaining capacity of the storage battery, it is possible to appropriately set the minimum power generation amount or the minimum rotation speed of the internal combustion engine, and thereby prevent over discharge of the storage battery, while satisfying the required driving force of the electrical motor, even with a power generator or internal combustion engine with a low output.

Further, the power generation control device is preferably arranged such that the controller derives the minimum power generation amount or the minimum rotation speed of the internal combustion engine, based on an estimated gradient value of a road surface.

By such a power generation control device, as the minimum power generation amount or the minimum rotation speed of the internal combustion engine can be derived, based on the estimated gradient value of a road surface, it is possible to appropriately set the minimum power generation amount or the minimum rotation speed of the internal combustion engine, and thereby prevent over discharge of the storage battery, while satisfying the required driving force of the electrical motor, even with a power generator or internal combustion engine with a low output.

Still further, the power generation control device preferably includes temperature adjusting means operated by electric power from the storage battery, wherein the controller derives the minimum power generation amount or the minimum rotation speed of the internal combustion engine, corresponding to an operation state of the temperature adjusting means.

By such a power generation control device, as the minimum power generation amount or the minimum rotation speed of the internal combustion engine can be derived, based on the state of an electric power consuming device, the state being little dependent on the driving state (for example, vehicle speed) of the vehicle, it is possible to appropriately set the minimum power generation amount or the minimum rotation speed of the internal combustion engine, and thereby prevent over discharge of the storage battery, while satisfying the required driving force of the electrical motor, even with a power generator or internal combustion engine with a low output.

Advantages of the Invention

According to the present invention, it is possible to provide a power generation control device capable of improving the operation efficiency of an internal combustion engine, while satisfying the required driving force of an electrical motor. Particularly, on a series type hybrid automobile having a power generator with a low output (an internal combustion engine with a small displacement), the output being lower compared with that of a conventional power generator, it is possible to improve the operation efficiency of the internal combustion engine, while satisfying the required driving force of the electrical motor.

BRIEF DESCRIPTION OF THE DRAWINGS

FIGS. 8A and 8B are graphs illustrating the power generation amount limiting process (upper limit value) in the first embodiment, wherein
FIG. 8A is a graph showing the relation between the net fuel consumption rate and the internal combustion engine output,
and FIG. 8B is a graph showing the relation between the power generation output and the vehicle;
FIGS. 10A and 10B are graphs illustrating the power generation amount limiting process (lower limit value) in the second embodiment, wherein
FIG. 10A is a graph showing the relation between the net fuel consumption rate and the internal combustion engine output,
and FIG. 10B is a graph showing the relation between the power generation output and the vehicle speed;
FIG. 14 is a flowchart of a rotation speed limiting process (lower limit value) in a fourth embodiment.

EMBODIMENTS FOR CARRYING OUT THE INVENTION

Figure 1:
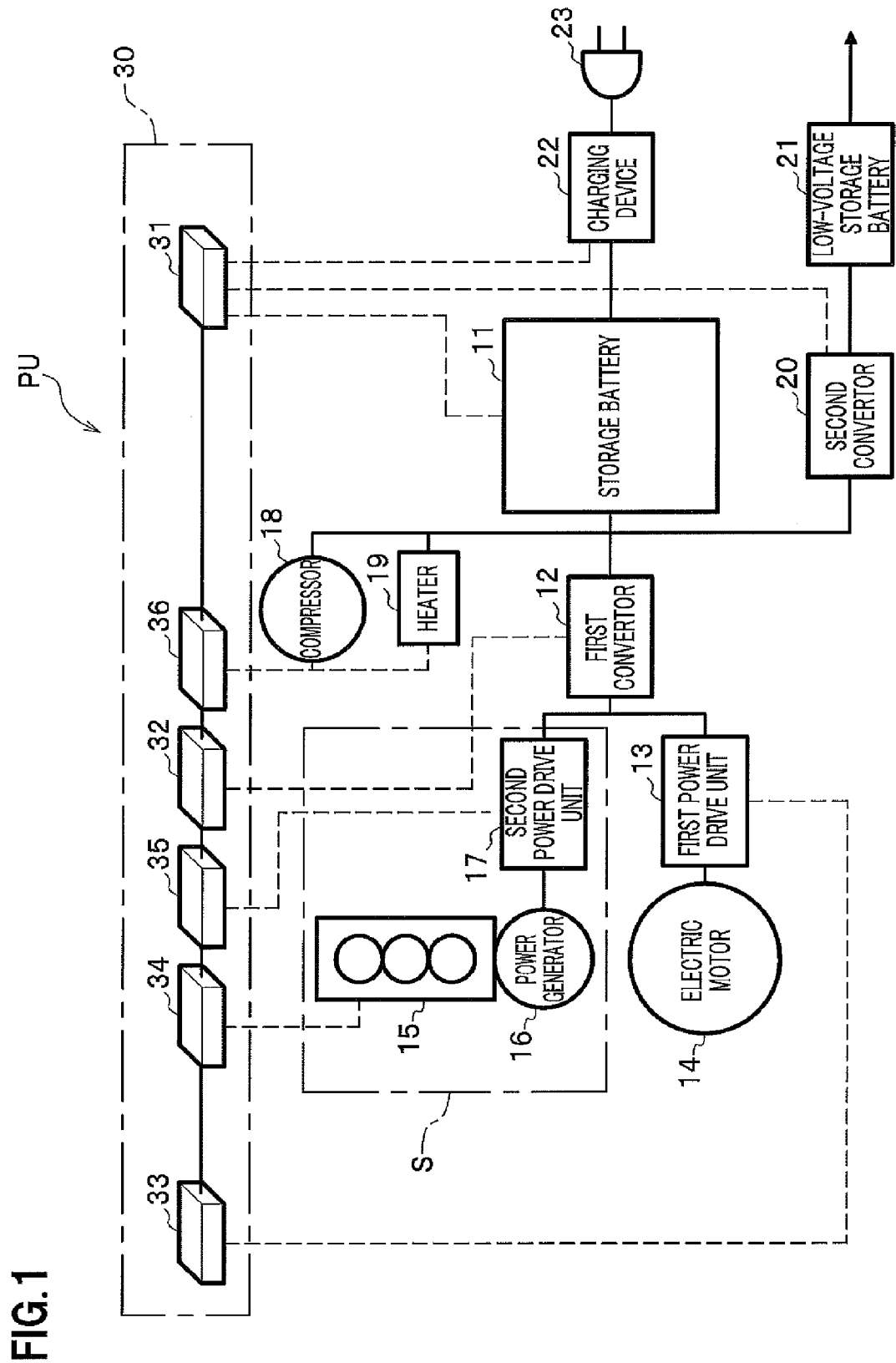
FIG. 1 is a block diagram showing the entire configuration of the power unit of a vehicle.

In the following, embodiments for carrying out the present invention (hereinafter, referred to as 'embodiment') will be described in detail, referring to the drawings, as appropriate. In the respective figures, the same symbols will be assigned to the same elements, and overlapping description will be omitted.

First Embodiment

Power Unit

FIG. 1 is a block diagram showing the entire configuration of the power unit of a vehicle.

As shown in FIG. 1, a power unit PU mounted on the vehicle (hybrid vehicle) is provided with a storage battery 11, a first convertor 12, a first power drive unit 13, an electric motor 14, an internal combustion engine 15, a power generator 16, a second power drive unit 17, an electric compressor 18, an electric heater 19, a second convertor 20, a low-voltage storage battery 21, a charging device 22, an external charging plug 23, and a controller 30. Herein, the internal combustion engine 15, the power generator 16, and the second power drive unit 17 configure an auxiliary movement power section S for generating electric power by the driving force of the internal combustion engine 15.

The storage battery 11 is, for example, a lithium-ion (Li-ion) secondary battery, and allows charging and discharging.

The first convertor 12 is connected with the storage battery 11 at one end thereof, and is connected with the first power drive unit 13 and the second power drive unit 17 at the other end thereof.

The first power drive unit 13 is connected with the first convertor 12 and the second power drive unit 17 at one end thereof and is connected with the electric motor 14 at the other end thereof.

The electric motor 14 is, for example, a three-phase brushless motor, and is connected with the first power drive unit 13. Incidentally, though not shown, the output shaft (not shown) of the electric motor 14 is connected through a transmission (not shown) with the driving shaft (not shown) of driving wheels (not shown), wherein the rotational driving force of the electric motor 14 is connected to the driving wheels (not shown) to be able to transmit the force.

For example, during driving of the electric motor 14, DC electric power output from the storage battery 11 is converted by the first convertor 12, further transformed by first power drive unit 13 into three-phase AC electric power, and is supplied to the electric motor 14. Thus, the vehicle (hybrid automobile) can run.

On the other hand, for example, during deceleration of the vehicle (hybrid automobile), driving force is transmitted from the driving shaft (not shown) to the output shaft (not shown) of the electric motor 14, and the electric motor 14 can function as a power generator for regenerative power generation. Three-phase AC electric power output by regenerative power generation from the electric motor 14 is transformed into DC electric power by the first power drive unit 13, further converted by the first convertor 12, and is supplied to the storage battery 11. Thus, the kinetic energy of the vehicle is converted into electrical energy, and the storage battery 11 can thereby be charged.

The internal combustion engine 15 consumes fuel and rotates a crankshaft (not shown). The crankshaft (not shown) of the internal combustion engine 15 is connected via a transmission (not shown) to the rotation shaft (not shown) of the power generator 16 so that the rotational driving force of the internal combustion engine 15 can be transferred to the power generator 16.

The power generator 16 is, for example, a three-phase brushless motor, and is connected with the second power drive unit 17. Incidentally, the power generator 16 uses a three-phase brushless motor with a smaller size and lower output compared with the electric motor 14.

The second power drive unit 17 is connected with the power generator 16 at one end thereof, and is connected with the first convertor 12 and the second power drive unit 17 at the other end thereof.

For example, by driving the internal combustion engine 15, driving force is transmitted from the crankshaft (not shown) to the rotation shaft (not shown) of the power generator 16, and the power generator 16 thus generates power. Three-phase AC electric power output from the power generator 16 is transformed by the second power drive unit 17 into DC electric power, further converted by the first convertor 12, and is supplied to the storage battery 11. Thus, fuel is consumed and the storage battery 11 can be charged.

Further, three-phase AC electric power output from the power generator 16 is transformed into DC electric power by the second power drive unit 17, further transformed into three-phase AC electric power by the first power drive unit 13, and supplied to the electric motor 14.

The electric compressor 18 is a compressor forming a heat pump circuit for thermal transfer between the inside of the vehicle compartment and the outside of the vehicle compartment to perform air conditioning in the vehicle compartment. The electric compressor 18 is connected to the storage battery 11 to be operated by electric power supplied from the storage battery 11.

Still further, the electric heater 19 is arranged to heat the air in the vehicle compartment in order to perform air conditioning inside the vehicle compartment. The electric heater 19 is connected to the storage battery 11, and is operated by electric power supplied from the storage battery 11.

The second convertor 20 is connected with the storage battery 11 and the first convertor 12 at one end thereof, and is connected with the low-voltage storage battery 21 at the other end thereof. The second convertor 20 decreases the voltage supplied from the storage battery 11 and/or the first convertor 12 (for example, down to 12V), and can charge the low-voltage storage battery 21.

The low-voltage storage battery 21 is one with a voltage (for example, 12V) lower than the voltage of the storage battery 11, and functions as an electric power source for supplying electric power to the controller 30 and the like.

Incidentally, arrangement may be made such that, for example, in a case that the remaining capacity (SOC: State Of Charge) of the storage battery 11 is low, the voltage of electric power supplied from the low-voltage storage battery 21 is increased by the second convertor 20, and the storage battery 11 can be thus charged.

The charging device 22 is connected with the external charging plug 23 connectable with an external electric power source (not shown) at one end thereof, and is connected with the storage battery 11 at the other end thereof. The external charging plug 23 is connected with an external electric power source (for example, a commercial electric power source), and the storage battery 11 can thereby be charged.

The controller 30 is configured with various ECUs (Electronic Control Unit), which are configured by electronic circuits, for example, a CPU (Central Processing Unit). The controller 30 includes a storage battery ECU 31, a convertor ECU 32, an electrical motor ECU 33, an internal combustion engine ECU 34, a power generator ECU 35, and an air-conditioning ECU 36, wherein the respective ECUs are communicably connected.

The storage battery ECU 31 is arranged to be able to perform control of monitoring, protecting, and the like of a high-voltage electrical unit system including the storage battery 11, and control of operation of electric power conversion of the second convertor 20 and the charging device 22. Incidentally, the storage battery ECU 31 is connected with a voltage sensor (not shown) for detecting the voltage of the storage battery 11, a current sensor (not shown) for detecting the current of the storage battery 11, a temperature sensor (not shown) for detecting the temperature of the storage battery 11, and the like so that detection signals output from these sensors are input. Further, based on the respective detection signals of the voltage between terminals, the current and the temperature of the storage battery 11, the storage battery ECU 31 can compute various state amounts such as the remaining capacity SOC of the storage battery 11. Incidentally, the remaining capacity SOC may be computed by integrating the charge/discharge current detected by the current sensor, and the remaining capacity SOC may be computed from OCV (Open Circuit Voltage), based on the correlation between the remaining capacity SOC and the open circuit voltage (OCV) of the storage battery 11.

The convertor ECU 32 can control charge/discharge between the storage battery 11, and the auxiliary movement power section S and the electric motor 14, by controlling the electric power conversion operation performed by the first convertor 12.

The electrical motor ECU 33 can control the electric power conversion operation performed by the first power drive unit 13, and can thereby control driving and regenerative power generation of the electric motor 14.

The internal combustion engine ECU 34 can control, for example, fuel supply and ignition timing to the internal combustion engine 15. Incidentally, the internal combustion engine ECU 34 is connected with a cooling water temperature sensor (not shown) for detecting the cooling water temperature TW of the internal combustion engine 15 and other sensors, and detection signals output from these sensors can be input to the internal combustion engine ECU 34.

The power generator ECU 35 controls the electric power conversion operation performed by the second power drive unit 17, and can thereby control power generation performed by the power generator 16.

The air-conditioning ECU 36 controls the operation of the electric compressor 18 and the electric heater 19, and can thereby control air conditioning inside the vehicle compartment.

Further, the controller 30 is connected with various sensors (not shown) and the like, and detection signals output from these sensors are input to the controller 30.

A vehicle speed sensor (not shown) detects vehicle speed VP that is the speed of the vehicle having the power unit PU, and outputs a detection signal to the controller 30. Incidentally, the controller 30 is arranged such as to be able to compute the acceleration α of the vehicle, based on the difference between the vehicle speed VP and the previous value of the vehicle speed VP.

An accelerator open degree sensor (not shown) detects the pedaling amount of an accelerator pedal (not shown) by a driver, and outputs a detection signal to the controller 30. Then, based on the detection signal of the pedaling amount of the accelerator pedal, the controller 30 converts it into the accelerator open degree AP. Incidentally, the pedaling amount of the accelerator pedal and the accelerator open degree AP may be controlled either linearly or nonlinearly.

A brake pedal sensor (not shown) detects whether or not a brake pedal (not shown) is pedaled by the driver, and a detection signal is output to the controller 30.

A select range sensor (not shown) detects a select range selected by operation of a select lever (not shown) by the driver, and a detection signal is output to the controller 30.

A starter switch (not shown) is a switch that is pressed when the vehicle (hybrid vehicle) starts, and a detection signal is output to the controller 30.

Operation Mode Determining Process

Figure 2:
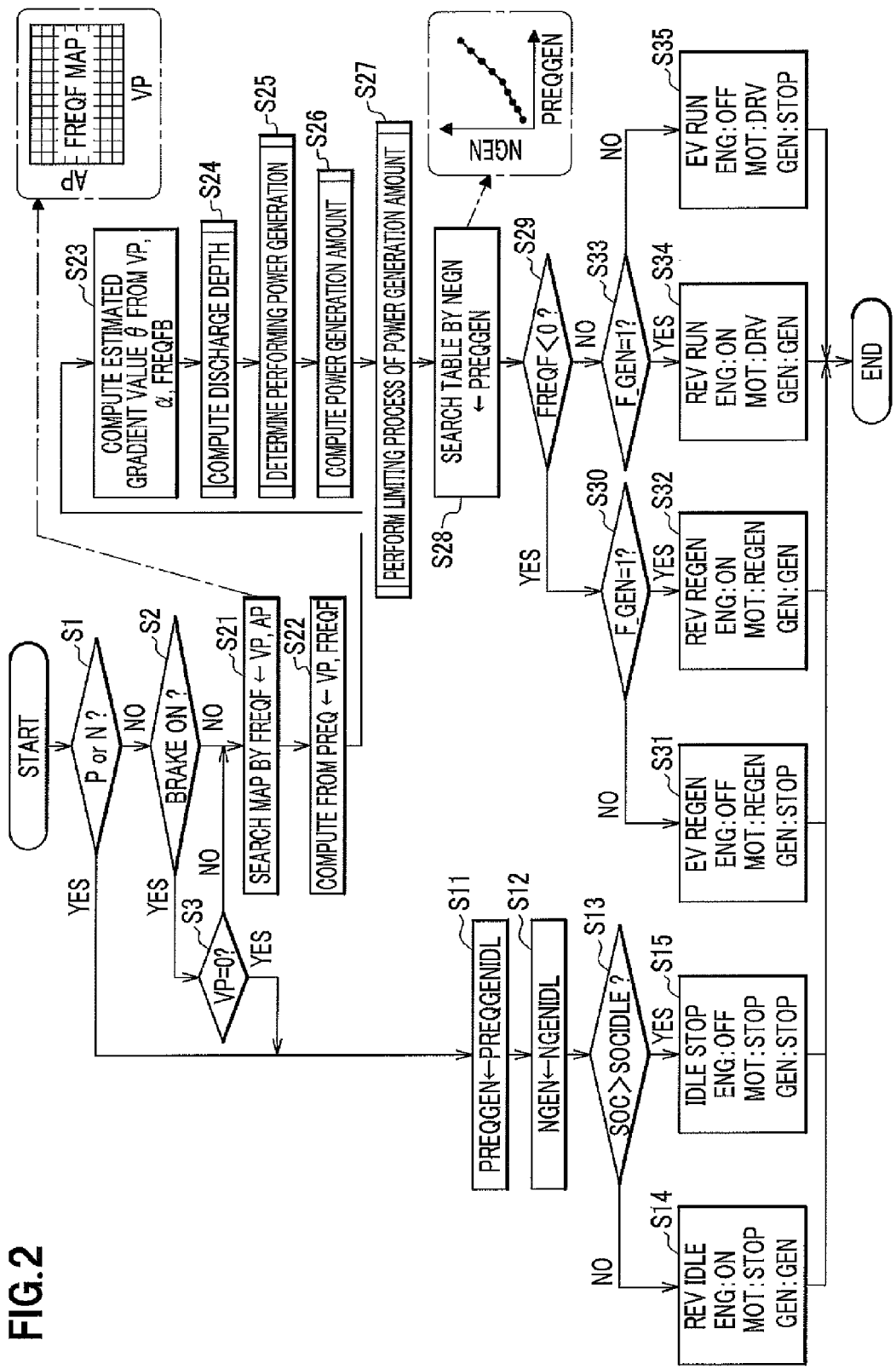
FIG. 2 is a flowchart of the operation mode determining process of the power unit in a first embodiment.

In the following, the operation mode determining process of the power unit PU in the first embodiment will be described, referring to FIG. 2. FIG. 2 is a flowchart of the operation mode determining process of the power unit PU in the first embodiment.

In step S1, the controller 30 determines whether or not the selection range is either one of P range (parking range) and N range (neutral range) (P or N?). If the selection range is either P range or N range (S1 Yes), then the process by the controller 30 proceeds to step S11. If the selection range is neither P range nor N range (S1 No), then the process by the controller 30 proceeds to step S2.

In step S2, the controller 30 determines whether or not the brake pedal (not shown) is pedaled by the driver (BRAKE ON?). If the brake pedal is pressed down (S2 Yes), then the process by the controller 30 proceeds to step S3. On the other hand, if the brake pedal is not pedaled (S2 No), then the process by the controller 30 proceeds to step S21.

In step S3, the controller 30 determines whether or not the vehicle speed VP is '0' (VP=0?). If the vehicle speed VP is '0' (S3 Yes), then the process by the controller 30 proceeds to step S11. Incidentally, when the process proceeds to step S11, the vehicle is in idling state. On the other hand, if the vehicle speed VP is not '0' (S3 No), then the process by the controller 30 proceeds to step S21.

In step S11, the controller 30 sets a power generator power generation output PREQGEN, which is the power generation amount of the power generator 16, to a power generator power generation output PREQGENIDL in idling state (PREQGEN←PREQGENIDL). Incidentally, the power generator power generation output PREQGENIDL in idling state is a set value having been set in advance and is stored in the controller 30.

In step S12, the controller 30 sets the rotation speed NGEN of the internal combustion engine for the power generator, which is the rotation speed of the internal combustion engine 15, to a rotation speed NGENIDL of the internal combustion engine for the power generator in idling state (NGEN←NGENIDL). Incidentally, the rotation speed NGENIDL of the internal combustion engine for the power generator in idling state is a set value having been set in advance, and is stored in the controller 30.

In step S13, the controller 30 determines whether or not the remaining capacity SOC of the storage battery 11 is greater than the upper limit remaining capacity SOCIDLE for performing power generation in idling state (SOC>SOCIDLE?). Herein, the upper limit remaining capacity SOCIDLE for performing power generation in idling state is a threshold value having been set in advance, and is stored in the controller 30. If the remaining capacity SOC is greater than the upper limit remaining capacity SOCIDLE for performing power generation in idling state (S13 Yes), then the process by the controller 30 proceeds to step S15. On the other hand, if the remaining capacity SOC is not greater than the upper limit remaining capacity SOCIDLE for performing power generation in idling state (S13 No), then the process by the controller 30 proceeds to step S14.

In step S14, the controller 30 sets the operation mode of the power unit PU to the first mode (REVIDLE), and terminates the operation mode determining process of the power unit PU.

Herein, the first mode (REVIDLE) is a mode for performing power generation by the auxiliary movement power section S in a state that the electric motor 14 is stopped. Thus, the electric power generated by the auxiliary movement power section S is charged to the storage battery 11, and the remaining capacity SOC of the storage battery 11 is thereby increased. Concretely, the electrical motor ECU 33 controls the first power drive unit 13 such as to stop the electric motor 14 (MOT: stop). The internal combustion engine ECU 34 controls the internal combustion engine 15 such that the rotation speed of the internal combustion engine 15 becomes the rotation speed NGEN, of the internal combustion engine for the power generator, having been set in step S12 (namely, the rotation speed NGENIDL of the internal combustion engine for the power generator in idling state) (ENG: ON). The power generator ECU 35 controls the second power drive unit 17 such that the power generation amount of the power generator 16 becomes the power generator power generation output PREQGEN having been set in step S11 (namely, the power generator power generation output PREQGENIDL in idling state) (GEN: power generation). The convertor ECU 32 controls the first convertor 12 such as to charge the electric power generated by the auxiliary movement power section S to the storage battery 11. The storage battery ECU 31 monitors and protects the storage battery 11.

In step S15, the controller 30 sets the operation mode of the power unit PU to the second mode (IDLE STOP), and terminates the operation mode determining process of the power unit PU.

Herein, the second mode (IDLE SROP) is a mode that stops the auxiliary movement power section S (does not perform power generation) in a state of making the electric motor 14 stopped. Concretely, the electrical motor ECU 33 controls the first power drive unit 13 such as to stop the electric motor 14 (MOT: stop). The internal combustion engine ECU 34 controls the internal combustion engine 15 such as to stop the internal combustion engine 15 (ENG: OFF). The power generator ECU 35 controls the second power drive unit 17 such as to stop the power generator 16 (GEN: stop).

In step S21, the controller 30 performs map searching for the required driving force FREQF of the electric motor 14, based on the vehicle speed VP and the accelerator open degree AP (MAP searching by FREQF←VP, AP). Herein, the required driving force FREQF is the driving force that the driver requires the electric motor 14 to generate. Incidentally, the map of the required driving force FREQF versus speed VP and accelerator open degree AP is stored in the controller 30 in advance. Incidentally, the map of required driving force FREQF can be set such that, for example, if the vehicle speed VP is higher than or equal to a predetermined vehicle speed, the higher the vehicle speed VP, the lower the required driving force FREQF. Further, as there is a case, for example, that the driving force is negative (namely, regenerative) if the vehicle speed is low (the vehicle speed VP is lower than a predetermined vehicle speed) and the accelerator open degree AP is nearly zero, the required driving force FREQF can be set such as to become close to zero as the accelerator open degree AP becomes larger.

In step S22, the controller 30 computes an output PREQ for the required driving force of the electric motor 14 from the vehicle speed VP and the required driving force FREQF obtained in step S21 (computation by PREQ←VP, FREQF). Herein, the output PREQ for required driving is an electric power amount that is output from the storage battery 11 (and/or the auxiliary movement power section S) to the electric motor 14 in order to make the electric motor 14 generate the required driving force FREQF obtained in step S21. Incidentally, the computation expression for the output PREQ for required driving is determined by the characteristics of the electric motor 14 and are stored in the controller 30 in advance.

In step S23, the controller 30 computes an estimated gradient value θ from the vehicle speed VP, the acceleration α, and the required driving force (previous value) FREQFB, which is the previous value of the required driving force FREQF (computation of an estimated gradient value θ from VP, α, and FREAFB). Herein, an estimated gradient value θ is an estimated value of the gradient of the road surface on which the vehicle having the power unit PU is currently running.

Further, an estimated gradient value θ is computed by Expression (1), based on the required driving force (previous value) FREQFB, the air resistance Ra, the rolling resistance Rr, the acceleration resistance Rc, the vehicle weight W, and the gravity acceleration g. Incidentally, the air resistance Ra is computed by Expression (2), based on the air resistance coefficient λ, the front projected area S, and the vehicle speed VP. The rolling resistance Rr is computed by Expression (3), based on the vehicle weight W and the rolling resistance coefficient μ. The acceleration resistance Rc is computed by Expression (4), based on the acceleration α and the vehicle weight W. Incidentally, the gravity acceleration g, the air resistance coefficient λ, the front projected area S, the vehicle weight W, and the rolling resistance coefficient μ are set values having been set in advance, and are stored in the controller 30.

$$\theta = \frac{[FREQFB - (Ra + Rr + Rc)]}{W \times n} \quad (1)$$

$$Ra = \lambda \times S \times VP^2 \quad (2)$$

$$Rr = W \times \mu \quad (3)$$

$$Rc = \alpha \times W \quad (4)$$

In step S24, the controller 30 computes the discharge depth DOD of the storage battery 11 (computation of discharge depth). Details will be described later, referring to FIG. 3.

In step S25, the controller 30 determines whether or not to perform power generation by the auxiliary movement power section S (determination of performing power generation). That is, the controller 30 performs flag processing on whether to perform power generation by the auxiliary movement power section S (the later-described power generation performing flag F_GEN=1) or not to perform power generation (the later-described power generation performing flag F_GEN=0). Details will be described later, referring to FIG. 4.

In step S26, the controller 30 computes the power generator power generation output PREQGEN, which is the power generation amount of the power generator 16 (computation of power generation amount). Details will be described later, referring to FIG. 5.

In step S27, the controller 30 performs a limiting processing of the power generator power generation output PREQGEN computed in step S26 (power generation amount limiting process). Details will be described later, referring to FIG. 6.

In step S28, the controller 30 performs table searching for a rotation speed NGEN of the internal combustion engine for the power generator, the rotation speed NGEN being the rotation speed of the internal combustion engine 15, based on the power generator power generation output PREQGEN obtained by the limit processing in step S27 (table searching by NGEN←PREQGEN). Incidentally, the table of rotation speed NGEN of the internal combustion engine for the power generator versus power generator power generation output PREQGEN is stored in the controller 30 in advance. Incidentally, this table is arranged, as shown in FIG. 2, such that the higher the power generator power generation output PREQGEN, the higher the rotation speed NGEN of the internal combustion engine for the power generator.

In step S29, the controller 30 determines whether or not the required driving force FREQF of the electric motor 14 obtained in step S21 is smaller than '0' (FREQF<0?). If the required driving force FREQF is smaller than '0' (S29 Yes), then the process by the controller 30 proceeds to step S30. On the other hand, if the required driving force FREQF is not smaller than '0' (S29 No), then the process by the controller 30 proceeds to step S33.

In step S30, the controller 30 determines whether or not the power generation performing flag F_GEN obtained in step S25 is '1' (GEN: power generation) (F_GEN=1?) If the power generation performing flag F_GEN is '1' (GEN: power generation) (S30 Yes), then the process by the controller 30 proceeds to step S32. On the other hand, if the power generation performing flag F_GEN is not '1' (GEN: power generation) (S30 No), then the process by the controller 30 proceeds to step S31.

In step S31, the controller 30 sets the operation mode of the power unit PU to the third mode (EV REGEN), and terminates the operation mode determining process of the power unit PU.

Herein, the third mode (EV REGEN) is a mode for stopping the auxiliary movement power section S (for not performing power generation), in a state of making the electric motor 14 perform regenerative power generation. Thus, electric power by regenerative power generation by the electric motor 14 is charged to the storage battery 11, and the remaining SOC of the storage battery 11 is thereby increased. Concretely, the electrical motor ECU 33 controls the first power drive unit 13 such that the driving force of the electric motor 14 becomes the required driving force FREQF obtained in step S21 (such that the output of the regenerative power generation by the electric motor 14 becomes the output PREQ for the required driving obtained in step S22) (MOT regeneration). The internal combustion engine ECU 34 controls the internal combustion engine 15 such as to stop the internal combustion engine 15 (ENG: OFF). The power generator ECU 35 controls the second power drive unit 17 such as to stop the power generator 16 (GEN: stop). The convertor ECU 32 controls the first convertor 12 such as to charge the electric power regenerated by the electric motor 14 to the storage battery 11. The storage battery ECU 31 monitors and protects the storage battery 11.

In step S32, the controller 30 sets the operation mode of the power unit PU to a fourth mode (REV REGEN), and terminates the operation mode determining process of the power unit PU.

Herein, the fourth mode (REV REGEN) is a mode for performing power generation by the auxiliary movement power section S, in a state of making the electric motor 14 perform regenerative power generation. Thus, electric power regenerated by the electric motor 14 and electric power generated by the auxiliary movement power section S are charged to the storage battery 11, and the remaining capacity SOC of the storage battery 11 is thereby increased. Concretely, the electrical motor ECU 33 controls the first power drive unit 13 such that the driving force of the electric motor 14 becomes the required driving force FREQF obtained in step S21 (such that the output of the regenerative power generation of the electric motor 14 becomes the output PREQ for the required driving obtained in step S22) (MOT: regeneration). The internal combustion engine ECU 34 controls the internal combustion engine 15 such that the rotation speed of the internal combustion engine 15 becomes the rotation speed NGEN of the internal combustion engine for the power generator obtained in step S28 (ENG: ON). The power generator ECU 35 controls the second power drive unit 17 such that the power generation amount of the power generator 16 becomes the power generator power generation output PREQGEN obtained in step S26 and step S27 (GEN: power generation). The convertor ECU 32 controls the first convertor 12 such as to charge the electric power regenerated by the electric motor 14 and the electric power generated by the auxiliary movement power section S to the storage battery 11. The storage battery ECU 31 monitors and protects the storage battery 11.

In step S33, the controller 30 determines whether or not the power generation performing flag F_GEN obtained in step S25 is '1' (GEN: power generation) (F_GEN=1?) If the power generation performing flag F_GEN is '1' (GEN: power generation) (S33 Yes), then the process by the controller 30 proceeds to step S34. On the other hand, if the power generation performing flag F_GEN is not '1' (GEN: power generation) (S33 No), then the process by the controller 30 proceeds to step S35.

In step S34, the controller 30 sets the operation mode of the power unit PU to a fifth mode (REV RUN), and terminates the operation mode determining process of the power unit PU.

Herein, the fifth mode (REV RUN) is a mode for generating power by the auxiliary movement power section S and running by driving the electric motor 14 by electric power generated by the auxiliary movement power section S and/or electric power stored in the storage battery 11. Thus, in case that electric power consumed by the electric motor 14 is higher than the electric power generated by the auxiliary movement power section S, the amount of decrease in the remaining capacity SOC of the storage battery 11 is reduced. If electric power consumed by the electric motor 14 is lower than the electric power generated by the auxiliary movement power section S, a part of electric power generated by the auxiliary movement power section S is charged to the storage battery 11, to thereby increase the remaining capacity SOC of the storage battery 11. Concretely, the electrical motor ECU 33 controls the first power drive unit 13 such that the driving force of the electric motor 14 becomes the required driving force FREQF obtained in step S21 (such that electric power supplied to the electric motor 14 becomes the output PREQ for the required driving obtained in step S22)(MOT: drive). The internal combustion engine ECU 34 controls the internal combustion engine 15 such that the rotation speed of the internal combustion engine 15 becomes the rotation speed NGEN of the internal combustion engine for the power generator obtained in step S28 (ENG: ON). The power generator ECU 35 controls the second power drive unit 17 such that the power generation amount of the power generator 16 becomes the power generator power generation output PREQGEN obtained in step S26 and step S27 (GEN: power generation). The convertor ECU 32 controls the first convertor 12 such as to supply electric power generated by the auxiliary movement power section S and/or electric power stored in the storage battery 11 to the electric motor 14. The storage battery ECU 31 monitors and protects the storage battery 11.

In step S35, the controller 30 sets the operation mode of the power unit PU to a sixth mode (EV RUN), and terminates the operation mode determining process of the power unit PU.

Herein, the sixth mode (EV RUN) is a mode for running by driving the electric motor 14 by electric power stored in the storage battery 11 and stopping the auxiliary movement power section S (without performing power generation). Thus, it is possible to run the vehicle by the electric power stored in the storage battery 11 without consuming the fuel for the internal combustion engine 15. Concretely, the electrical motor ECU 33 controls the first power drive unit 13 such that the driving force of the electric motor 14 becomes the required driving force FREQF obtained in step S21 (such that electric power supplied to the electric motor 14 becomes the output PREQ for the required driving obtained in step S22) (MOT: drive). The internal combustion engine ECU 34 drives the internal combustion engine 15 such as to stop the internal combustion engine 15 (ENG: OFF). The power generator ECU 35 controls the second power drive unit 17 such as to stop the power generator 16 (GEN: stop). The convertor ECU 32 controls the first convertor 12 such as to supply electric power generated by the auxiliary movement power section S and/or electric power stored in the storage battery 11 to the electric motor 14. The storage battery ECU 31 monitors and protects the storage battery 11.

Discharge Depth Computing Process

Figure 3:
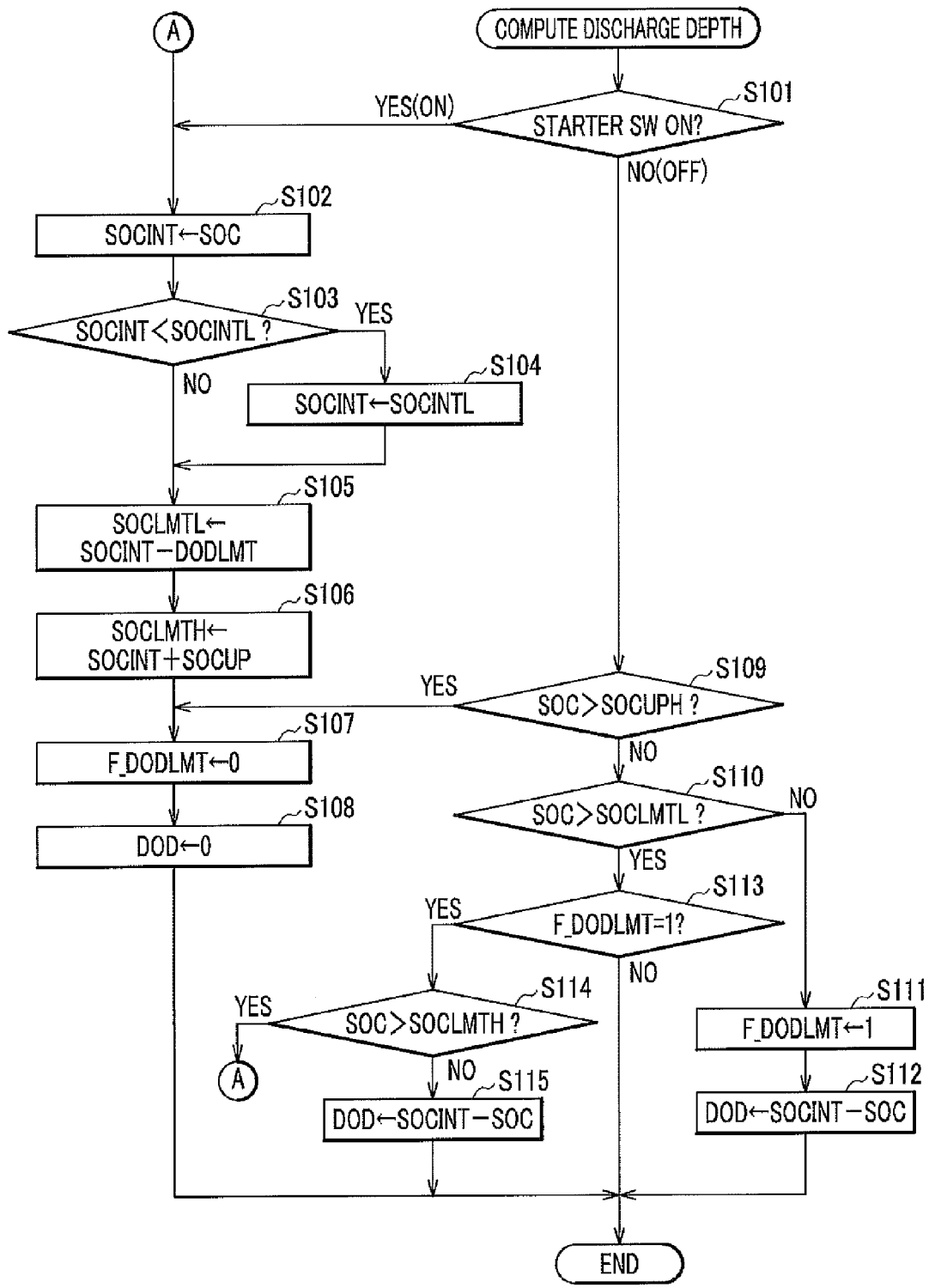
FIG. 3 is a flowchart of a discharge depth computing process.

In the following, a discharge depth computing process in step S24 will be described, referring to FIG. 3. FIG. 3 is a flowchart of the discharge depth computing process.

In step S101, the controller 30 determines whether or not it is a time when the starter switch has been turned on (starter SW ON?) Herein, 'a time when the starter time switch has been turned on' is the first computation timing after the starter switch is pressed. If it is a time when the starter switch has been turned on (S101 Yes), then the process by the controller 30 proceeds to step S102. On the other hand, if it is not a time when the starter switch has been turned on (S101 No), then the process by the controller 30 proceeds to step S109.

In step S102, the controller 30 sets a discharge depth computation reference remaining capacity SOCINT to the remaining capacity SOC of the storage battery 11 (SOCINT←SOC).

In step S103, the controller 30 determines whether or not the discharge depth computation reference remaining capacity SOCINT is smaller than a discharge depth computation reference remaining capacity lower limit value SOCINTL (SOCINT<SOCINTL?) Herein, the discharge depth computation reference remaining capacity lower limit value SOCINTL is a set value having been set in advance, and is stored in the controller 30. If the discharge depth computation reference remaining capacity SOCINT is smaller than the discharge depth computation reference remaining capacity lower limit value SOCINTL (S103 Yes), then the process by the controller 30 proceeds to step S104. On the other hand, if the discharge depth computation reference remaining capacity SOCINT is not smaller than the discharge depth computation reference remaining capacity lower limit value SOCINTL (S103 No), then the process by the controller 30 proceeds to step S105.

In step S104, the controller 30 sets the discharge depth computation reference remaining capacity SOCINT to the discharge depth computation reference remaining capacity lower limit value SOCINTL (SOCINT←SOCINTL). Then, the process by the controller 30 proceeds to step S105.

In step S105, the controller 30 sets a discharge depth computation performing lower limit threshold value SOCLMTL to a value of the discharge depth computation reference remaining capacity SOCINT subtracted by a discharge depth computation performing determining discharge amount DODLMT (SOCLMTL←SOCINT−DODLMT). Incidentally, the discharge depth computation performing determining discharge amount DODLMT (see FIG. 7) is a set value having been set in advance, and is stored in the controller 30.

In step S106, the controller 30 sets a discharge depth computation performing upper limit threshold value SOCLMTH to a value obtained by adding a discharge depth computation performing determining charge amount SOCUP to the discharge depth computation reference remaining capacity SOCINT (SOCLMTH←SOCINT+SOCUP). Incidentally, the discharge depth computation performing determining charge amount SOCUP (see FIG. 7) is a set value having been set in advance, and is stored in the controller 30.

In step S107, the controller 30 sets a discharge depth computation performing flag F_DODLMT to '0' (not performing) (F_DODLMT←0).

In step S108, the controller 30 sets a discharge depth DOD to '0', which is the initial value, (DOD←0), terminates the discharge depth computing process (step S24), and the process proceeds to step S25 (see FIG. 2).

Further, in step S109, the controller 30 determines whether or not the remaining capacity SOC is greater than a discharge depth computation performing upper limit remaining capacity SOCUPH (SOC>SOCUPH?) Herein, the discharge depth computation performing upper limit remaining capacity SOCUPH is a threshold value having been set in advance, and is stored in the controller 30. If the remaining capacity SOC is greater than the discharge depth computation performing upper limit remaining capacity SOCUPH (S109 Yes), then the process by the controller 30 proceeds to step S107. On the other hand, if the remaining capacity SOC is not greater than the discharge depth computation performing upper limit remaining capacity SOCUPH (S109 No), then the process by the controller 30 proceeds to step S110.

In step S110, the controller 30 determines whether or not the remaining capacity SOC is greater than the discharge depth computation performing lower limit threshold value SOCLMTL (see step S105) (SOC>SOCLMTL?) If the remaining capacity SOC is greater than the discharge depth computation performing lower limit threshold value SOCLMTL (S110 Yes), then the process of the controller 30 proceeds to step S113. On the other hand, if the remaining capacity SOC is not greater than the discharge depth computation performing lower limit threshold value SOCLMTL (S110 No), then the process by the controller 30 proceeds to step S111.

In step S111, the controller 30 sets the discharge depth computation performing flag F_DODLMT to '1' (performing) (F_DODLMT←1).

In step S112, the controller 30 sets the discharge depth DOD to the discharge depth computation reference remaining capacity SOCINT subtracted by the remaining capacity SOC (DOD←SOCINT−SOC), terminates the discharge depth computing process (step S24), and the process proceeds to step S25 (see FIG. 2).

In step S113, the controller 30 determines whether or not the discharge depth computation performing flag F_DODLMT is '1' (performing) (F_DODLMT=1?) If the discharge depth computation performing flag F_DODLMT is '1' (performing) (S113 Yes), the process by the controller 30 proceeds to step S114. On the other hand, if the discharge depth computation performing flag F_DODLMT is not '1' (performing) (S113 No), the controller 30 terminates the discharge depth computing process (step S24), and the process proceeds to step S25 (see FIG. 2).

In step S114, the controller 30 determines whether or not the remaining capacity SOC is greater than the discharge depth computation performing upper limit threshold value SOCLMTH (see step S106) (SOC>SOCLMTH?) If the remaining capacity SOC is greater than the discharge depth computation performing upper limit threshold value SOCLMTH (S114 Yes), then the process by the controller 30 proceeds to step S102. On the other hand, if the remaining capacity SOC is not greater than the discharge depth computation performing upper limit threshold value SOCLMTH (S114 No), then the process by the controller 30 proceeds to step S115.

In step S115, the controller 30 set the discharge depth DOD to a value of the discharge depth computation reference remaining capacity SOCINT subtracted by the remaining capacity SOC (DOD←SOCINT−SOC), terminates the discharge depth computing process (step S24), and the process by the controller 30 proceeds to step S25 (see FIG. 2).

Operation Example of Discharge Depth Computing Process

Figure 7:
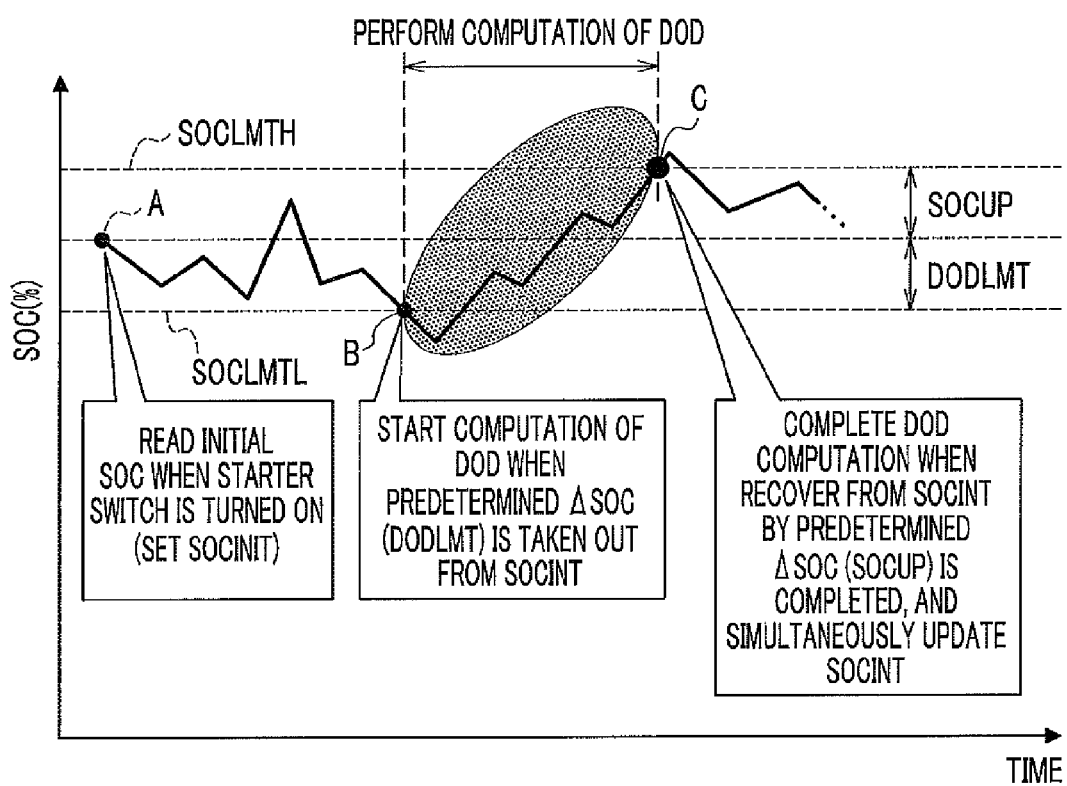
FIG. 7 is a graph illustrating the discharge depth computing process, wherein the horizontal axis represents time, and the vertical axis represents the remaining storage amount of a storage battery.

Herein, an operation example of the discharge depth computing process will be described, referring to FIG. 7. FIG. 7 is a graph illustrating the discharge depth computing process, wherein the horizontal axis represents time, and the vertical axis represents the ratio (%) of the remaining capacity SOC of the storage battery 11.

First, when the starter switch is turned on (point A in FIG. 7), the remaining capacity SOC of the storage battery 11 is read in and is set as the discharge depth computation reference remaining capacity SOCINT (S101 in FIG. 3 Yes, see S102). Further, the discharge depth computation performing lower limit threshold value SOCLMTL and the discharge depth computation performing upper limit threshold value SOCLMTH are computed from the discharge depth computation reference remaining capacity SOCINT (see S105 and S106 in FIG. 3), and the discharge depth computation performing flag F_DODLMT and the discharge depth DOD are initialized (see S107 and S108 in FIG. 3).

Incidentally, though differently from the example in FIG. 7, the discharge depth computation reference remaining capacity SOCINT has a lower limit value, and if the remaining capacity SOC is smaller than a discharge depth computation reference remaining capacity lower limit value SOCINTL, the discharge depth computation reference remaining capacity lower limit value SOCINTL is set as the discharge depth computation reference remaining capacity SOCINT (S103 in FIG. 3 Yes, see S104). Thus, the discharge depth computation performing lower limit threshold value SOCLMTL, which is the threshold value for starting computation of the discharge depth DOD, also has a lower limit value (SOCINTL−DODLMT), and accordingly, computation of the discharge depth DOD can be started, for example, even if the remaining capacity SOC of the storage battery 11 is small when the starter switch is turned on. Further, compared with a case of making the discharge depth computation reference remaining capacity SOCINT be a remaining capacity SOC smaller than the discharge depth computation reference remaining capacity lower limit value SOCINTL, it is possible to make the value of the discharge depth DOD larger. Thus, as described later, it is possible to perform control such that starting power generation tends to be determined in the power generation performing determining process (particularly see S203 in FIG. 4), and perform control toward direction which makes the power generation amount larger in the power generation amount computing process (particularly see S304 in FIG. 5). Thus, it is possible to prevent the storage battery 11 from over discharge.

Returning to the example in FIG. 7, until the remaining capacity SOC of the storage battery 11 becomes smaller than or equal to the discharge depth computation performing lower limit threshold value SOCLMTL (from point A to point B in FIG. 7), computation of the discharge depth DOD is not performed, and the discharge depth DOD remains '0' (see S110 Yes and S113 No).

When the remaining capacity SOC of the storage battery 11 becomes smaller than or equal to the discharge depth computation performing lower limit threshold value SOCLMTL (point B in FIG. 7), in other words, when the remaining capacity SOC becomes into a state that the discharge depth computation performing determining discharge amount DODLMT is taken out from the discharge depth computation reference remaining capacity SOCINT, computation of the discharge depth DOD is started (see S110 No and S111). Then, until the remaining capacity SOC of the storage battery 11 becomes larger than the discharge depth computation performing upper limit threshold value SOCLMTH (from point B to point C in FIG. 7), computation of the discharge depth DOD is started (see S112 and S115).

When the remaining capacity SOC of the storage battery 11 becomes larger than the discharge depth computation performing upper limit threshold value SOCLMTH (point C in FIG. 7), in other words, when the remaining capacity SOC becomes into a state that the remaining capacity SOC has recovered from the discharge depth computation reference remaining capacity SOCINT to the discharge depth computation performing upper limit threshold value SOCLMTH (see S114 Yes), computation of the discharge depth DOD is terminated (see S107 and S108) and the discharge depth computation reference remaining capacity SOCINT is updated (see S102-S104).

Incidentally, though differently from the example in FIG. 7, if the remaining capacity SOC of the storage battery 11 is larger than the discharge depth computation performing upper limit remaining capacity SOCUPH, then the discharge depth DOD is set to '0' without updating the discharge depth computation reference remaining capacity SOCINT, and computation is terminated (see S109 Yes, S107, S108). That is, when the remaining capacity SOC of the storage battery 11 includes a spare amount, computation of the discharge depth DOD is not performed.

Power Generation Performing Determination

Figure 4:
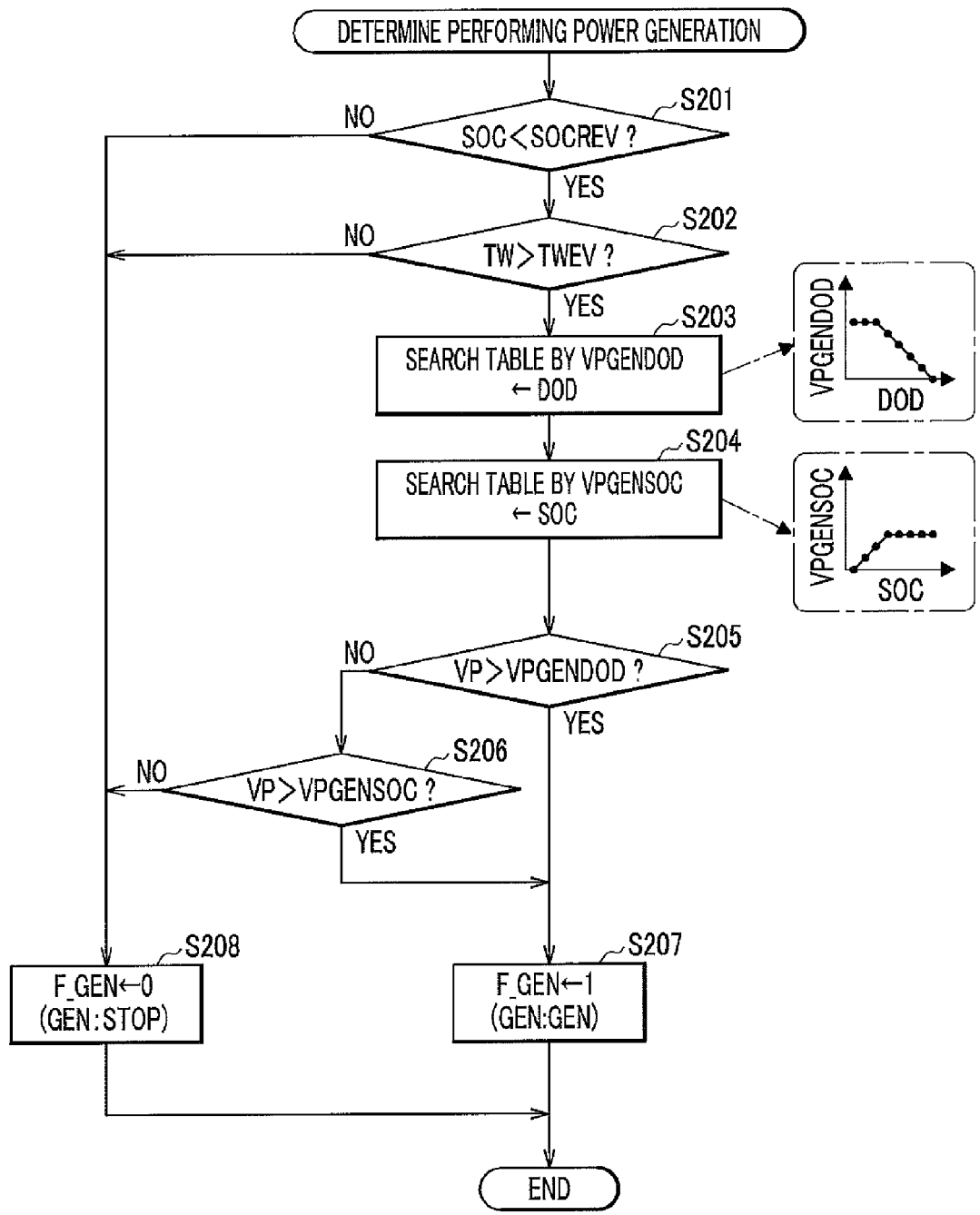
FIG. 4 is a flowchart of a power generation performing determining process.

In the following, the power generation performing determining process in S25 will be described, referring to FIG. 4. FIG. 4 is a flowchart of the power generation performing determining process.

In step S201, the controller 30 determines whether or not the remaining capacity SOC is smaller than a REV mode power generation performing upper limit remaining capacity SOCREV (SOC <SOCREV?) If the remaining capacity SOC is smaller than the REV mode power generation performing upper limit remaining capacity SOCREV (S201 Yes), then the process by the controller 30 proceeds to step 5202. On the other hand, if the remaining capacity SOC is not smaller than the REV mode power generation performing upper limit remaining capacity SOCREV (S201 No), then the process by the controller 30 proceeds to step S208.

In step S202, the controller 30 determines whether or not the cooling water temperature TW of the internal combustion engine 15 is higher than an EV mode performing upper limit water temperature TWEV (TW>TWEV?) Herein, the EV mode performing upper limit water temperature TWEV is a threshold value for determining whether or not the internal combustion engine 15 is during warming-up. The controller 30 performs control to prohibit power generation by the power generator power generator 16 until the warming-up of the internal combustion engine 15 is completed. If the cooling water temperature TW is higher than the EV mode performing upper limit water temperature TWEV (in other words, if warming-up is completed) (S202 Yes), then the process by the controller 30 proceeds to step S203. On the other hand, if the cooling water temperature TW is not higher than the EV mode performing upper limit water temperature TWEV (in other words, if warming-up is not completed) (S202 No), then the process by the controller 30 proceeds to step S208.

In step S203, the controller 30 performs table searching for a power generation performing lower limit vehicle speed VPGENDOD by discharge depth, based on the discharge depth DOD (table searching by VPGENDOD←DOD). Herein, the power generation performing lower limit vehicle speed VPGENDOD by the discharge depth is a threshold value for determining whether or not to perform power generation by the auxiliary movement power section S, based on the vehicle speed VP (see step S205 described later). Incidentally, the table of power generation performing lower limit vehicle speed VPGENDOD versus discharge depth DOD is stored in the controller 30 in advance. As shown in FIG. 4, this table is arranged such that if the discharge depth DOD has become larger than or equal to a predetermined value, then, the larger the discharge depth DOD, the lower the power generation performing lower limit vehicle speed VPGENDOD by the discharge depth.

In step S204, the controller 30 performs table searching for a power generation performing lower limit vehicle speed VPGENSOC by the remaining capacity, based on the remaining capacity SOC (table searching by VPGENSOC←SOC). Herein, the power generation performing lower limit vehicle speed VPGENSOC by the remaining capacity is a threshold value for determining whether or not to perform power generation by the auxiliary movement power section S, based on the vehicle speed VP (see step S206 described later). Incidentally, the table of power generation performing lower limit vehicle speed VPGENSOC by the remaining capacity versus remaining capacity SOC is stored in the controller 30 in advance. This table is arranged such that, as shown in FIG. 4, if the remaining capacity SOC has become smaller than or equal to a predetermined value, then, the smaller the remaining capacity SOC, the lower the power generation performing lower limit vehicle speed VPGENSOC by the remaining capacity.

In step S205, the controller 30 determines whether or not the vehicle speed VP is higher than the power generation performing lower limit vehicle speed VPGENDOD (see step S203) by the discharge depth (VP>VPGENDOD?). If the vehicle speed VP is higher than the power generation performing lower limit vehicle speed VPGENDOD by the discharge depth (S205 Yes), then the process by the controller 30 proceeds to step S207. On the other hand, if the vehicle speed VP is not higher than the power generation performing lower limit vehicle speed VPGENDOD by the discharge depth (S205 No), then the process by the controller 30 proceeds to step S206.

In step S206, the controller 30 determines whether or not the vehicle speed VP is higher than the power generation performing lower limit vehicle speed VPGENSOC (see step S204) by the remaining capacity (VP>VPGENSOC?) If the vehicle speed VP is higher than the power generation performing lower limit vehicle speed VPGENSOC by the remaining capacity (S206 Yes), then the process by the controller 30 proceeds to step S207. On the other hand, if the vehicle speed VP is not higher than the power generation performing lower limit vehicle speed VPGENSOC by the remaining capacity (S206 No), then the process by the controller 30 proceeds to step S208.

In step S207, the controller 30 sets the power generation performing flag F_GEN to '1' (GEN: power generation) (F_GEN←1). Then, the controller 30 terminates the power generation performing determining process (step S25), and the process by the controller 30 proceeds to step S26 (see FIG. 2).

In step S208, the controller 30 sets the power generation performing flag F_GEN to '0' (GEN: stop) (F_GEN←0). Then, the controller 30 terminates the power generation performing determining process (step S25), and the process by the controller 30 proceeds to step S26 (see FIG. 2).

In such a manner, the power generation performing determining process shown in FIG. 4 is arranged as follows. When the discharge depth DOD has increased, or the remaining capacity SOC has decreased, in other words, when the storage battery 11 may become into a state of over discharge, the threshold value (the power generation performing lower limit vehicle speed VPGENDOD by the discharge depth or the power generation performing lower limit vehicle speed VPGENSOC by the remaining capacity) of the vehicle speed VP for starting power generation by the auxiliary movement power section S is decreased, and it is thereby possible to prevent the storage battery 11 from over discharge.

For example, also by operation of a load, such an air conditioner or a heater, that is not related with the state of driving load, the remaining capacity SOC of the storage battery 11 decreases (and/or the discharge depth DOD increases). A power generation control device provided with a conventional power generator (an internal combustion engine) with a comparatively high output has been arranged such that, if a vehicle is in a low vehicle speed state with a vehicle speed VP lower than a predetermined threshold value, power generation is not started until the remaining capacity SOC of the storage battery 11 becomes lower than or equal to a predetermined value. Nevertheless, as a power generator (an internal combustion engine) with a comparatively high output is provided, even when continuous high load operation (for example, driving on a climbing road) occurs in a state that the remaining capacity SOC of the storage battery 11 has dropped, it is conventionally possible to satisfy the output requirement of the electric motor 14.

On the other hand, in a case that a power generator 16 with a low output (an internal combustion engine 15 with a small displacement) is provided, when continuous high load operation occurs in a state that the remaining capacity SOC of the storage battery 11 has dropped, the power generator 16 with a low output (an internal combustion engine 15 with a small displacement) cannot satisfy the output requirement of the electric motor 14, and the storage battery 11 may fall into an over discharge state.

In this situation, by decreasing the threshold of the vehicle speed VP for starting power generation by the auxiliary movement power section S, power generation is started even in a low vehicle speed state. Thus, it is possible to start power generation and thereby recover the remaining capacity SOC of the storage battery 11 even in a low vehicle speed state. Accordingly, even in transitions into a continuous high load operation, it is possible to prevent the storage battery 11 from becoming into an over discharge state. That is, it is possible to appropriately perform energy control at a low vehicle speed and a low output.

Power Generation Amount Computing Process

Figure 5:
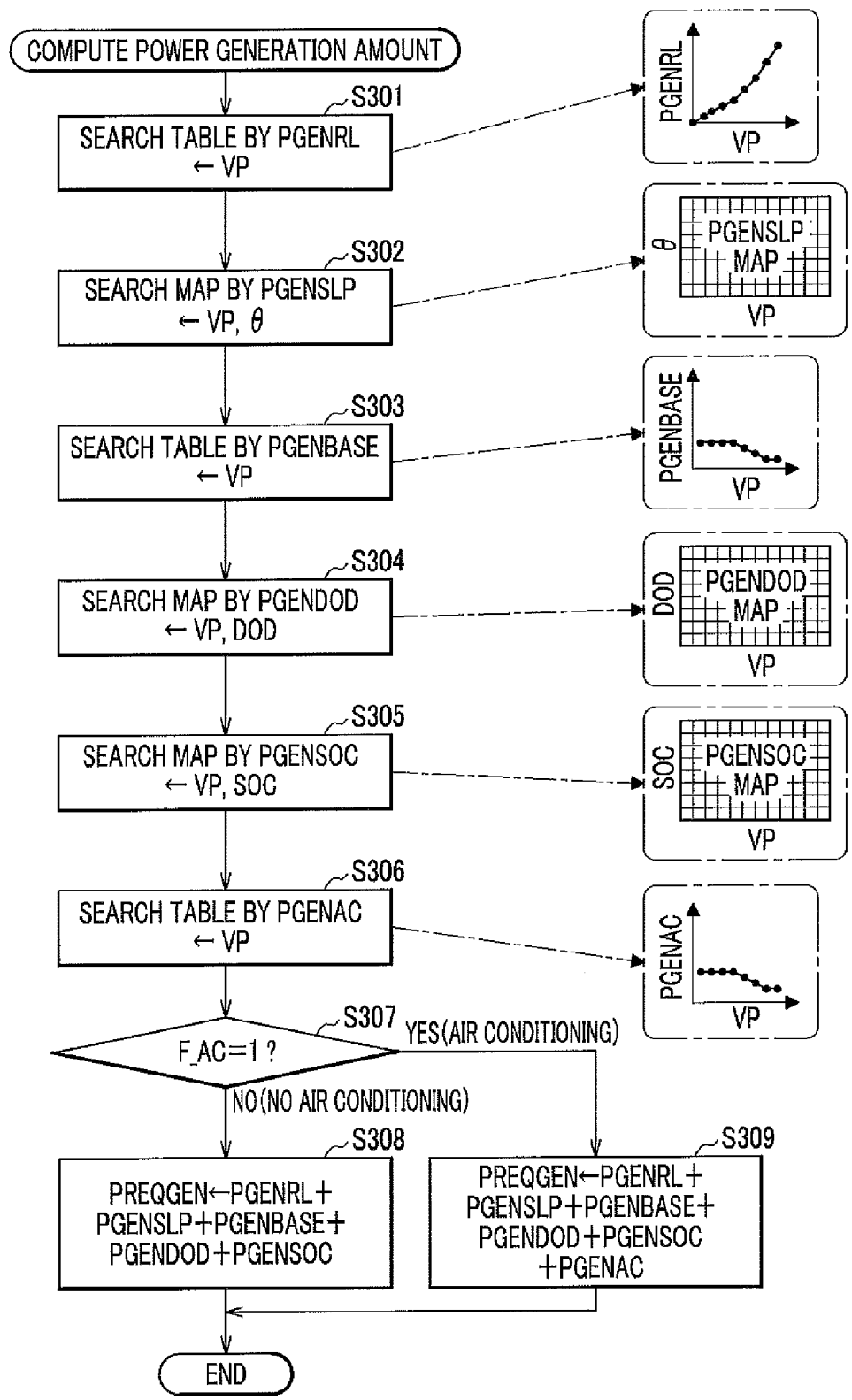
FIG. 5 is a flowchart of a power generation amount computing process in the first embodiment.

In the following, a power generation amount computing process in step S26 will be described, referring to FIG. 5. FIG. 5 is a flowchart of a power generation amount computing process in the first embodiment.

In step S301, the controller 30 performs table searching, based on the vehicle speed VP, for a power generation amount PGENRL that is corresponding to an output necessary for cruising at an individual vehicle speed (table searching by PGENRL←VP). Herein, the power generation amount PGENRL, which is corresponding to an output necessary for cruising at an individual vehicle speed, is an electric power amount to be supplied to the electric motor 14 in order to generate a driving force that is strong enough to overcome the air resistance Ra and the rolling resistance Rr of the vehicle. Incidentally, the table of power generation amount PGENRL corresponding to an output necessary for cruising at an individual vehicle speed versus vehicle speed VP is stored in the controller 30 in advance. Incidentally, as shown in FIG. 5, this table is arranged such that the higher the vehicle speed VP, the larger the power generation amount PGENR, which is corresponding to an output necessary for cruising at an individual vehicle speed.

In step S302, the controller 30 performs map searching for a power generation correction amount PGENSLP at an individual vehicle speed and gradient, based on the vehicle speed VP and an estimated gradient value θ (see step S23 in FIG. 2) of a road surface (MAP searching by PGENSLP←VP, θ). Incidentally, the map of power generation correction amount PGENSLP versus vehicle speed VP and estimated gradient value θ is stored in the controller 30 in advance. The map of power generation correction amount PGENSLP at individual vehicle speed and gradient can be set such that, for example, the larger the estimated gradient value θ, the larger power generation correction amount PGENSLP, and in case that the estimated gradient value θ is constant, the higher the vehicle speed VP, the smaller the power generation correction amount PGENSLP.

In step S303, the controller 30 performs table searching for a power generation add-on basic amount PGENBASE at an individual vehicle speed, based on the vehicle speed VP (table searching by PGENBASE←VP). Incidentally, the table of power generation add-on basic amount PGENBASE at individual vehicle speed versus vehicle speed VP is stored in the controller 30 in advance. This table is arranged such that, as shown in FIG. 5, the higher the vehicle speed VP, the smaller the power generation add-on basic amount PGENBASE at individual vehicle speed.

In step S304, the controller 30 performs map searching for a power generation add-on amount PGENDOD at an individual vehicle speed and discharge depth, based on the vehicle speed VP and the discharge depth DOD (MAP searching by PGENDOD←VP, DOD). Incidentally, the map of power generation add-on amount PGENDOD at individual vehicle and discharge depth versus vehicle speed VP and discharge depth DOD is stored in the controller 30 in advance. The map of power generation add-on amount PGENDOD at individual vehicle speed and discharge depth can be set such that, for example, the larger the discharge depth DOD, the larger the power generation add-on amount PGENDOD, and in case that the discharge depth DOD is constant, the higher the vehicle speed VP, the smaller the power generation add-on amount PGENDOD.

In step S305, the controller 30 performs map searching for a power generation add-on amount PGENSOC at an individual vehicle speed and remaining capacity, based on the vehicle speed VP and the remaining capacity SOC (MAP searching by PGENSOC←VP, SOC). Incidentally, the map of power generation add-on amount PGENSOC at vehicle speed and remaining capacity versus vehicle speed VP and remaining capacity SOC is stored in the controller 30 in advance. The map of power generation add-on amount PGENSOC at individual vehicle speed and remaining capacity can be set such that, for example, the smaller the remaining capacity SOC, the larger the power generation add-on amount PGENSOC, and in case that the remaining capacity SOC is constant, the higher the vehicle speed VP, the smaller the power generation add-on amount PGENSOC.

In step S306, the controller 30 performs table searching for a power generation add-on amount PGENAC during usage of an air conditioner, at an individual vehicle speed, based on the vehicle speed VP (table searching by PGENAC←VP). Incidentally, the table of power generation add-on amount PGENAC during usage of an air conditioner at individual vehicle speed versus vehicle speed VP is stored in the controller 30 in advance. This table is arranged such that, as shown in FIG. 5, the higher the vehicle speed VP, the smaller the power generation add-on amount PGENAC during usage of an air conditioner at individual vehicle speed.

In step S307, the controller 30 determines whether or not an air conditioner using flag F_AC is '1' (air conditioner used) (F_AC=1?) The air conditioning ECU 36 sets the air conditioner using flag F_AC to '1' (air conditioner used) when the electric compressor 18 and/or the electric heater 19 is operated, and sets the air conditioner using flag F_AC to '0' when neither the electric compressor 18 nor the electric heater 19 is operated (air conditioner not used). If the air conditioner using flag F_AC is '1' (air conditioner used) (S307 Yes), then the process by the controller 30 proceeds to step S309. On the other hand, if the air conditioner using flag F_AC is not '1' (air conditioner used) (S307 Not), then the process by the controller 30 proceeds to step S308.

In step S308, the controller 30 sets a power generator power generation output PREQGEN, which is the power generation amount of the power generator 16, to a value obtained by adding the power generation amount PGENRL (see S301) corresponding to an output necessary for cruising at an individual vehicle speed, the power generation correction amount PGENSLP (see S302) at the individual vehicle speed and gradient, the power generation add-on basic amount PGENBASE (see S303) at the individual vehicle speed, the power generation add-on amount PGENDOD (see S304) at the individual vehicle speed and discharge depth, and the power generation add-on amount PGENSOC (see S305) at the individual vehicle speed and remaining capacity. Then, the controller 30 terminates the power generation amount computing process (step S26), and the process by the controller 30 proceeds to step S27 (see FIG. 2).

In step S309, the controller 30 sets a power generator power generation output PREQGEN, which is the power generation amount of the power generator 16, to a value obtained by adding the power generation amount PGENRL (see S301) corresponding to output necessary for cruising at an individual vehicle speed, the power generation correction amount PGENSLP (see S302) at the individual vehicle speed and gradient, the power generation add-on basic amount PGENBASE (see S303) at the individual vehicle speed, the power generation add-on amount PGENDOD (see S304) at the individual vehicle speed and discharge depth, the power generation add-on amount PGENSOC (see S305) at the individual vehicle speed and remaining capacity, and the power generation add-on amount PGENAC (see S306) at the individual vehicle speed and air conditioner using time. Then, the controller 30 terminates the power generation amount computing process (step S26), and the process by the controller 30 proceeds to step S27 (see FIG. 2).

In such a manner, so-called 'cruising output following type control' can be realized, wherein power generation is performed by the auxiliary movement power section S, based on the power generator power generation output PREQGEN (see S308 and S309) that is obtained by adding the power generation amount PGENRL (see S301) corresponding to output necessary for cruising at an individual vehicle speed, the power generation amount PGENRL being an output corresponding to the air resistance Ra and the rolling resistance Rr of the vehicle which occur when the vehicle runs, and the power generation add-on basic amount PGENBASE (see S303) at the individual vehicle speed, the power generation add-on basic amount PGENBASE having been set as a spare amount.

Thus, it is possible to solve the problems with the conventional 'required output following type control' (see Patent Literature 1) that, if the required power generation amount of a power generator is high, the fuel economy drops with a deviation from the best fuel economy point of an internal combustion engine, and sounds and vibration generated by the internal combustion engine become significant, by which the merchantability falls. Further, it is possible to solve the problem with the conventional 'constant point operation type control' (see Patent Literature 2) that, if a power generator 16 with a low output (an internal combustion engine 15 with a small displacement) is provided, it is difficult to maintain energy due to the discharge tendency of the storage battery 11.

Further, as the power generation amount PGENRL (see S301) corresponding to output necessary for cruising at an individual vehicle speed is set, based on the vehicle speed VP, it is possible to charge the storage battery 11 with a surplus output of the auxiliary movement power section S, for example, on a descent or during deceleration of the vehicle. That is, instead of performing high output power generation that drops the efficiency of the internal combustion engine 15, energy maintenance of the storage battery 11 can be made even easier by that the frequency of power generation of the auxiliary movement power section S is increased, for example, on a descent or during deceleration of the vehicle.

Further, as the power generator power generation output PREQGEN is corrected by the power generation correction amount PGENSLP (see S302) at an individual vehicle speed and gradient, it is possible to appropriately control the power generation amount of the auxiliary movement power section S by compensating the effect by the estimated gradient value θ (see step S23 in FIG. 2) of a road surface. Still further, as the power generator power generation output PREQGEN is corrected by the power generation add-on amount PGENDOD (see S304) at the individual vehicle speed and discharge depth, it is possible to appropriately control the power generation amount of the auxiliary movement power section S by compensating the effect of the discharge depth DOD. Yet further, as the power generator power generation output PREQGEN is corrected by the power generation add-on amount PGENSOC (see S305) at the individual vehicle speed and remaining capacity, it is possible to appropriately control the power generation amount of the auxiliary movement power section S by compensating the effect of the remaining capacity SOC. Further, as the power generator power generation output PREQGEN is corrected by the power generation add-on amount PGENAC (see S306) at the individual vehicle speed and during air conditioner usage, it is possible to appropriately control the power generation amount of the auxiliary movement power section S by compensating the effect of the air conditioning load (electric compressor 18, electric heater 19). Thus, it is possible to appropriately perform energy control at a medium-high vehicle speed and medium-high output.

Power Generation Amount Limiting Process (Upper Limit Value)

Figure 6:
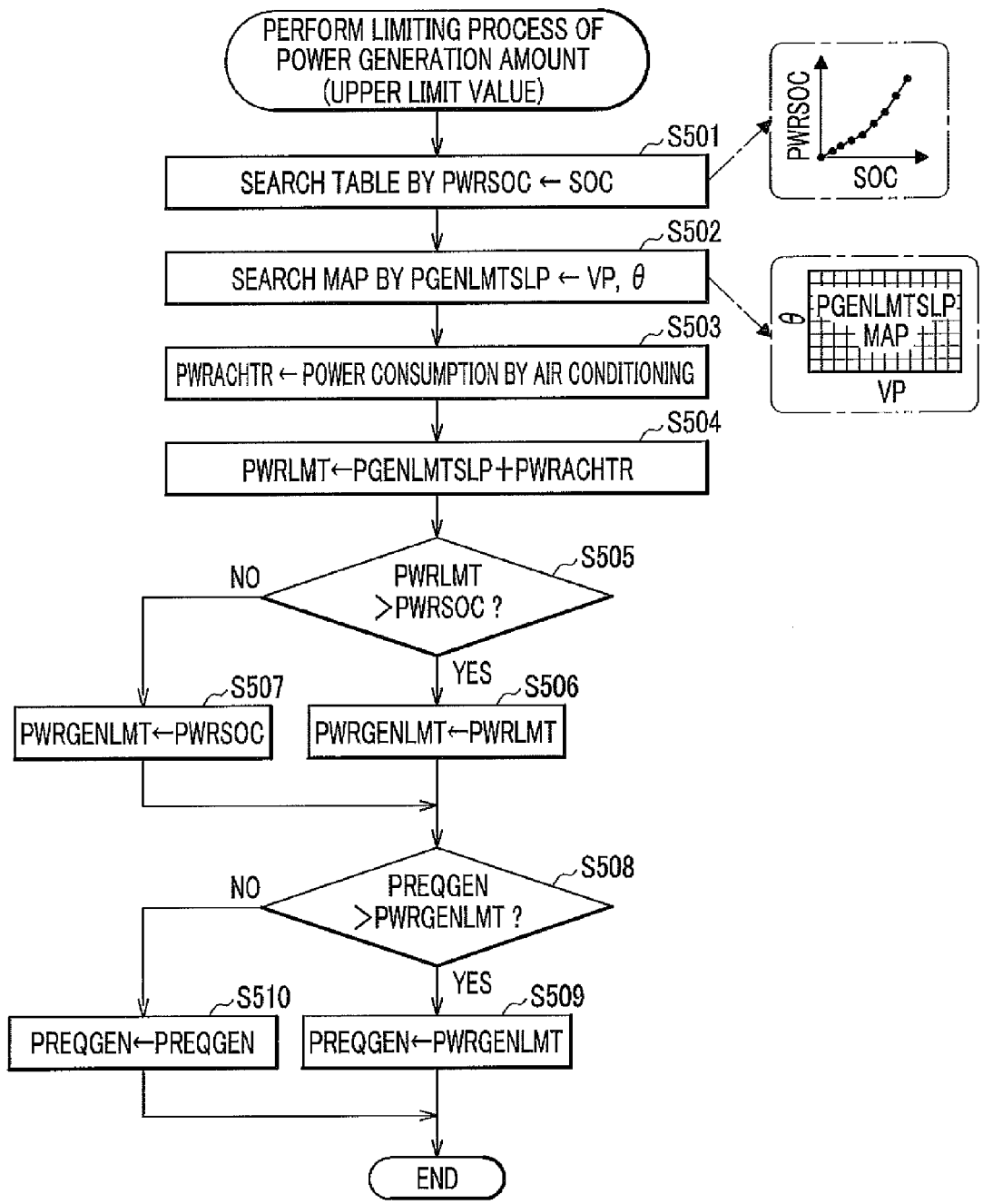
FIG. 6 is a flowchart of a power generation amount limiting process (upper limit value) in the first embodiment.

In the following, the power generation amount limiting process (upper limit value) in step S27 will be described, referring to FIG. 6. FIG. 6 is a flowchart of the power generation amount limiting process (upper limit value) in the first embodiment.

In step S501, the controller 30 performs table searching for an upper limit output PWRSOC in a BSFC best region, based on the remaining capacity SOC of the storage battery 11 (table searching by PWRSOC←SOC). Herein, the upper limit output PWRSOC of the BSFC best region is the upper limit value of the net fuel consumption rate (BSFC: Brake Specific Fuel Consumption) in controlling the internal combustion engine 15. Incidentally, the table of upper limit output PWRSOC in the BSFC best region versus remaining capacity SOC is stored in the controller 30 in advance. This table is arranged such that, as shown in FIG. 6, the larger the remaining capacity SOC, the larger the upper limit output PWRSOC in the BSFC best region.

In step S502, the controller 30 performs map searching for a power generation electric power requirement upper limit value PGENLMTSLP at the individual vehicle speed and gradient, based on the vehicle speed VP and the estimated gradient value θ of the road surface (see step S23 in FIG. 2) (MAP searching by PGENLMTSLP←VP, θ). Incidentally, the map of power generation electric power requirement upper limit value PGENLMTSLP at vehicle speed and gradient versus vehicle speed VP and estimated gradient value θ is stored in the controller 30 in advance. The map of power generation electric power requirement upper limit value PGENLMTSLP at vehicle speed and gradient can be set such that, for example, the larger the estimated gradient value θ, the larger the power generation electric power requirement upper limit value PGENLMTSLP; and the higher the vehicle speed VP, the larger the power generation electric power requirement upper limit value PGENLMTSLP.

In step S503, the controller 30 inputs and sets an electric power consumption PWRACHTR consumed by air conditioning (PWRACHTR←electric power consumption by air conditioning). Herein, the electric power consumption by air conditioning PWRACHTR is set to '0' if no air conditioning device (electric compressor 18, electric heater 19) is currently used, and if any air conditioning device (electric compressor 18, electric heater 19) is currently used, the electric power consumption by air conditioning PWRACHTR is set to the maximum electric power consumption by the air conditioning device (total in case of plural devices). Or, the electric power consumption by the air conditioning device/devices (electric compressor 18, electric heater 19) may be obtained by estimation. For example, in case of performing air conditioning in the vehicle compartment by operating a refrigeration cycle by the electric compressor 18, an electric power consumption can be estimated, based on the indoor temperature, the outdoor temperature, and the set temperature. Further, in case of performing air conditioning in the vehicle compartment by the electric heater 19, an electric power consumption can be estimated, based on the indoor temperature and the set temperature.

In step S504, the controller 30 sets a power generation electric power requirement upper limit value PWRLMT defined by air conditioning and gradient to a value obtained by adding the power generation electric power requirement upper limit value PGENLMTSLP (see S502) at a vehicle speed and a gradient and the electric power consumption PWRACHTR (see S503) consumed by air conditioning (PWRLMT←PGENLMTSLP+PWRACHTR).

In step S505, the controller 30 determines whether or not the power generation electric power requirement upper limit value PWRLMT (see S504) defined by air conditioning and a gradient is greater than the upper limit output PWRSOC (see S501) in the BSFC best region (PWRLMT>PWRSOC?) If the power generation electric power requirement upper limit value PWRLMT defined by air conditioning and gradient is greater than the upper limit output PWRSOC in the BSFC best region (S505 Yes), then the process by the controller 30 proceeds to step S506. On the other hand, if the power generation electric power requirement upper limit value PWRLMT defined by air conditioning and gradient is not greater than the upper limit output PWRSOC in the BSFC best region (S505 No), then the process by the controller 30 proceeds to step S507.

In step S506, the controller 30 sets a final power generation electric power limit value PWRGENLMT to a power generation electric power requirement upper limit value PWRLMT (see S504) defined by air conditioning and gradient (PWRGENLMT←PWRLMT). The, the process by the controller 30 proceeds to step S508.

In step S507, the controller 30 sets a final power generation electric power limit value PWRGENLMT to the upper limit output PWRSOC (see S501) in the BSFC best region (PWRGENLMT←PWRSOC). Then the process by the controller 30 proceeds to step S508.

In step S508, the controller 30 determines whether or not the power generator power generation output PREQGEN (see S308 and S309 in FIG. 5) is greater than the final power generation electric power limit value PWRGENLMT (see S506 and S507) (PREQGEN>PWRFENLMT?) If the power generator power generation output PREQGEN is greater than the final power generation electric power limit value PWRGENLMT (S508 Yes), then the process by the controller 30 proceeds to step S509. On the other hand, if the power generator power generation output PREQGEN is not greater than the final power generation electric power limit value PWRGENLMT (S508 No), then the process by the controller 30 proceeds to step S510.

In step S509, the controller 30 sets a power generator power generation output PREQGEN to the final power generation electric power limit value PWRGENLMT (PREQGEN←PWRGENLMT). Then, the controller 30 terminates the power generation amount limiting process (step S27), and the process proceeds to step S28 (see FIG. 2).

In step S510, the controller 30 sets the power generator power generation output PREQGEN to the power generator power generation output PREQGEN (PREQGEN←PREQGEN). Then, the controller 30 terminates the power generation amount limiting process (step S27), and the process proceeds to step S28 (see FIG. 2).

Figure 8A:
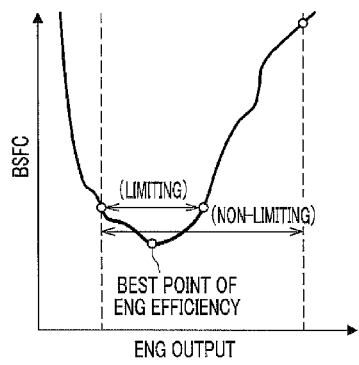
Figure 8B:
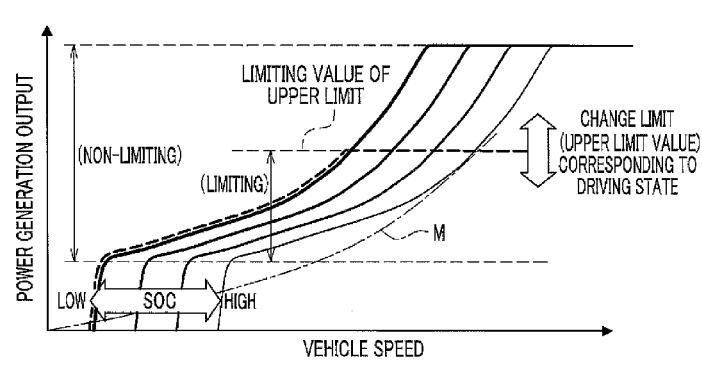

Herein, referring to FIG. 8, the operation and effect of the power generation amount limiting process will be described. FIGS. 8A and 8B are graphs illustrating the power generation amount limiting process (upper limit value) in the first embodiment, wherein FIG. 8A is a graph showing the relation between the net fuel consumption rate (BSFC) and the internal combustion engine output, and FIG. 8B is a graph showing the relation between the power generation output and the vehicle. Incidentally, in FIG. 8B, the power generation outputs (power generator power generation outputs PREQGEN) of the auxiliary movement power section S for respective remaining capacities SOC before the limiting process are represented by solid curves (during non-limiting), and the required electric power (output PREQ for required driving) of the electric motor 14 versus vehicle speed VP is represented by an alternate long and short dash line curve (M). Further, the power generation output (power generator power generation output PREQGEN) obtained by the limiting process is represented by the dashed curve (during limiting).

According to the present embodiment, when the power generation electric power requirement upper limit value PWRLMT (see S504) defined by air conditioning and gradient is small, for example, in a low load state that the vehicle is running on a flat road and the air conditioner (electric compressor 18), the heater (electric heater 19), nor the like, which is an air conditioning device, is not used, the upper limit output PWRSOC (see S501) in the BSFC best region is selected as the final power generation electric power limit value PWRGENLMT (see S507). Herein, the upper limit output PWRSOC in the BSFC best region becomes closer to the best fuel economy point (the best ENG efficiency point) shown in FIG. 8A as the remaining capacity SOC becomes larger. Accordingly, as it is possible to operate the internal combustion engine 15 in a region with an efficiency higher than or equal to a certain efficiency including the best point of fuel economy (the best point of ENG efficiency), fuel economy can be improved.

Further, in a high load state such as a state of acceleration, continuous driving on a climbing road, or using an air conditioning device, when the power generation electric power requirement upper limit PWRLMT (see S504) defined by air conditioning and gradient becomes greater than the upper limit output PWRSOC (see S501) in the BSFC best region, the power generation electric power requirement upper limit value PWRLMT (see S504) defined by air conditioning and gradient is selected as the final power generation electric power limit value PWRGENLMT (see S506). That is, as it is possible to change the upper limit limiting value (the final power generation electric power limit value PWRGENLMT) shown in FIG. 8B corresponding to a requirement of load, occurrence of shortage in output is prevented.

Second Embodiment
Power Unit

In the following, a power unit PU in a second embodiment will be described. The entire configuration of the power unit PU in the second embodiment is similar to that of the power unit PU (see FIG. 1) in the first embodiment, and description will be omitted.

Operation Mod Determining Process

In the following, the operation mode determining process (see FIG. 2) of the power unit PU in the second embodiment will be described. In step S27 in FIG. 2, the controllers 30 of the power units PU in the first embodiment and the second embodiment perform a limiting process of the power generator power generation output PREQGEN computed in step S26 (power generation amount limiting process). Herein, the power generation amount limiting process in the first embodiment is 'the power generation amount limiting process (upper limit value)' shown in FIG. 6. Differently, the power generation amount limiting process in the second embodiment is 'the power generation amount limiting process (lower limit value)' shown in FIG. 9. Other points are similar and description will be omitted.

Power Generation Amount Limiting Process (Lower Limit Value)

Figure 9:
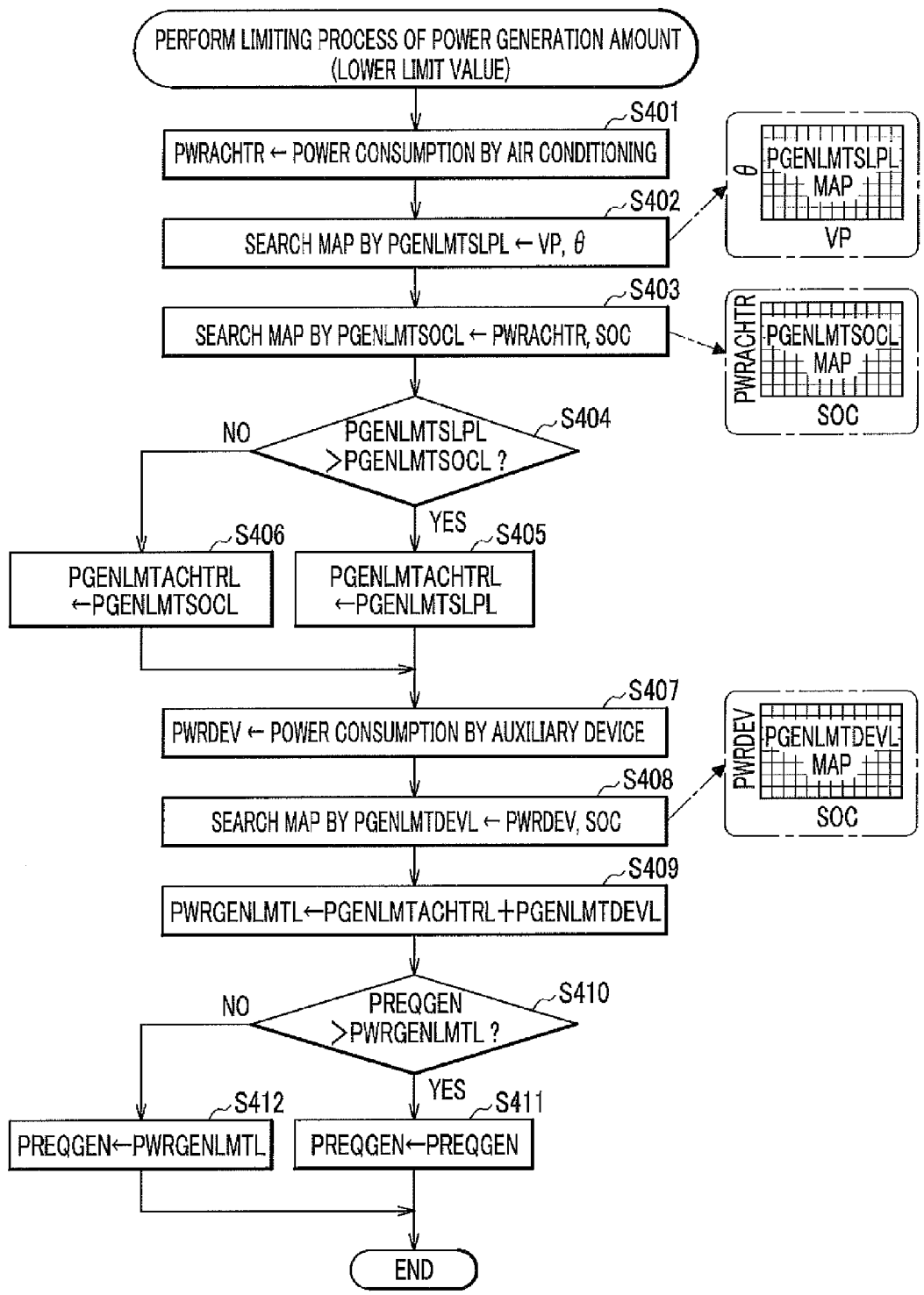
FIG. 9 is a flowchart of a power generation amount limiting process (lower limit value) in a second embodiment.

In the following, the power generation amount limiting process (lower limit value) in step S27 will be described, referring to FIG. 9. FIG. 9 is a flowchart of the power generation amount limiting process (lower limit value) in the second embodiment.

In step S401, the controller 30 sets an electric power consumption PWRACHTR by air conditioning (PWRACHTR←electric power consumption by air conditioning). Herein, if no air conditioning device (electric compressor 18, electric heater 19) is currently used, the electric power consumption PWRACHTR by air conditioning is set to '0', and if an air conditioning device/devices (electric compressor 18, electric heater 19) are currently used, the electric power consumption PWRACHTR is set to the maximum electric power consumption of the air conditioning device/devices (total if plural). Or, the electric power consumption of the air conditioning device/devices (electric compressor 18, electric heater 19) may be obtained by estimation. For example, in case that a refrigeration cycle is operated with the electric compressor 18 to perform air conditioning inside the vehicle compartment, the electric power consumption can be estimated, based on the indoor temperature, the outdoor temperature, and a set temperature. In case of heating the inside of the vehicle compartment by the electric heater 19, the electric power consumption can be estimated, based on the indoor temperature and the set temperature.

In step S402, the controller 30 performs map searching for a power generation electric power requirement lower limit value PGENLMTSLPL at vehicle speed and gradient, based on the vehicle speed VP and the estimated gradient value θ of the road surface (see step S23 in FIG. 2) (map searching by PGENLMTSLPL←VP, θ). Incidentally, the map of power generation electric power requirement lower limit value PGENLMTSLPL at vehicle speed and gradient versus vehicle speed VP and estimated gradient value θ is stored in the controller 30 in advance. The map of power generation electric power requirement lower limit value PGENLMTSLPL at vehicle speed and gradient can be set such that, for example, the larger the estimated gradient value θ, the larger the power generation electric power requirement lower limit value PGENLMTSLPL; and the higher the vehicle speed VP, the larger the power generation electric power requirement lower limit value PGENLMTSLPL.

In step S403, the controller 30 performs map searching for a power generation electric power requirement lower limit value PGENLMTSOCL at air conditioning and remaining capacity, based on the electric power consumption PWRACHTR (see S401) by air conditioning and the remaining capacity SOC of the storage battery 11 (MAP searching by PGENLMTSOCL←PWRACHTR, SOC). Incidentally, the map of power generation electric power requirement lower limit value PGENLMTSOCL at air conditioning and remaining capacity versus electric power consumption PWRACHTR by air conditioning and remaining capacity SOC is stored in the controller 30 in advance. The map of PGENLMTSOCL at air conditioning and remaining capacity can be set such that, for example, the larger the electric power consumption PWRACHTR by air conditioning, the larger the power generation electric power requirement lower limit value PGENLMTSOCL; and the larger the remaining capacity SOC, the larger the power generation electric power requirement lower limit value PGENLMTSOCL.

In step S404, the controller 30 determines whether or not the power generation electric power requirement lower limit value PGENLMTSLPL (see S402) at vehicle speed and gradient is greater than the power generation electric power requirement lower limit value PGENLMTSOCL (see S403) at air conditioning and remaining capacity (PGENLMTSLPL>PGENLMTSOCL?) If the power generation electric power requirement lower limit value PGENLMTSLPL at vehicle speed and gradient is greater than the power generation electric power requirement lower limit value PGENLMTSOCL at air conditioning and remaining capacity (S404 Yes), the process by the controller 30 proceeds to step S405. On the other hand, if the power generation electric power requirement lower limit value PGENLMTSLPL at vehicle speed and gradient is not greater than the power generation electric power requirement lower limit value PGENLMTSOCL at air conditioning and remaining capacity (S404 No), the process by the controller 30 proceeds to step S406.

In step S405, the controller 30 sets a first power generation electric power limit value PGENLMTACHTRL to the power generation electric power requirement lower limit value PGENLMTSLPL (see S402) at vehicle speed and gradient (PGENLMTACHTRL←PGENLMTSLPL). Then, the process by the controller 30 proceeds to step S407.

In step S406, the controller 30 sets the first power generation electric power limit value PGENLMTACHTRL to the power generation electric power requirement lower limit value PGENLMTSOCL (see S403) at air conditioning and remaining capacity (PGENLMTACHTRL←PGENLMTSOCL). Then, the process by the controller 30 proceeds to step S407.

In step S407, the controller 30 sets an electric power consumption PWRDEV by an auxiliary device/devices (PWRDEV←electric power consumption by auxiliary device). Herein, if no auxiliary device is currently used, the electric power consumption PWRDEV is set to '0', and if an auxiliary device/devices is/are currently used, the electric power consumption PWRDEV is set to the maximum electric power consumption (total if plural) of the auxiliary device/devices. Incidentally, herein, an auxiliary device is a unit that consumes the electric power of the storage battery 11, other than the air conditioning devices (electric compressor 18 and electric heater 19) and the electric motor 14.

In step S408, the controller 30 performs map searching for a second power generation electric power limit value PGENLMTDEVL, based on the electric power consumption PWRDEV (see S407) by an auxiliary device/devices and the remaining capacity SOC of the storage battery 11 (MAP searching by PGENLMTDEVL←PWRDEV, SOC). Incidentally, the map of the second power generation electric power limit value PGENLMTDEVL versus electric power consumption PWRDEV by auxiliary device/devices and remaining capacity SOC is stored in the controller 30 in advance. The map of second power generation electric power limit value PGENLMTDEVL can be set such that, for example, the higher the electric power consumption PWRDEV by auxiliary device/devices, the larger the second power generation electric power limit value PGENLMTDEVL; and the larger, the remaining capacity SOC, the larger the second power generation electric power limit value PGENLMTDEVL.

In step S409, the controller 30 sets a final power generation electric power limit value PWRGENLMTL to a value obtained by adding the first power generation electric power limit value PGENLMTACHTRL (see S405 and S406) and the second power generation electric power limit value PGENLMTDEVL (see S409) (PWRGENLMTL←PGENLMTACHTRL+PGENLMTDEVL).

In step S410, the controller 30 determines whether or not the power generator power generation output PREQGEN (see S308 and S309 in FIG. 5) is higher than the final power generation electric power limit value PWRGENLMTL (see S409) (PREQGEN>PWRGENLMTL?) If the power generator power generation output PREQGEN is higher than the final power generation electric power limit value PWRGENLMTL (S410 Yes), then the process by the controller 30 proceeds to step S411. On the other hand, if the power generator power generation output PREQGEN is not higher than the final power generation electric power limit value PWRGENLMTL (S410 No), then the process by the controller 30 proceeds to step S412.

In step S411, the controller 30 sets power generator power generation output PREQGEN to the power generator power generation output PREQGEN (PREQGEN←PREQGEN). Then, the power generation amount limiting process (step S27) is terminated, and the process proceeds to step S28 (see FIG. 2).

In step S412, the controller 30 sets power generator power generation output PREQGEN to the final power generation electric power limit value PWRGENLMTL (PREQGEN←PWRGENLMTL). Then, the power generation amount limiting process (step S27) is terminated, and the process proceeds to step S28 (see FIG. 2).

Herein, the operation and effect of the power generation amount limiting process will be described, referring to FIGS. 10A and 10B. FIGS. 10A and 10B are graphs illustrating the power generation amount limiting process (lower limit value) in the second embodiment, wherein FIG. 10A is a graph showing the relation between the net fuel consumption rate (BSFC) and the internal combustion engine output, and FIG. 10B is a graph showing the relation between the power generation output and the vehicle speed. Incidentally, in FIG. 10B, the power generation outputs (power generator power generation outputs PREQGEN) of the auxiliary movement power section S at respective remaining capacities SOC before the limiting process are represented by solid curves, and the required electric power (output PREQ for required driving) of the electric motor 14 versus vehicle speed VP is represented by an alternate long and short dash line curve (M).

The electric power consumption of the air conditioner (electric compressor 18) and the heater (electric heater 19), which are air conditioning devices, is independent from the driving state (for example, vehicle speed VP), and further, the electric power consumption becomes high at a start of operation of the air conditioning device/devices. Consequently, in so-called 'cruising output following type control' that changes the power generation amount correspondingly to the vehicle speed VP when operation of an air conditioning device is started at a low vehicle speed, it may occur that the remaining capacity SOC of the storage battery 11 rapidly drops and the energy budget balance is lost. Then, if continuous high load driving (for example, driving on a climbing road) is performed in a state that the remaining capacity SOC of the storage battery 11 has dropped, a structure provided with a power generator 16 with a low output (an internal combustion engine 15 with a small displacement) has a problem that the output requirement to the electric motor 14 cannot be satisfied.

Unlike this, according to the present embodiment, a greater one of the power generation electric power requirement lower limit value PGENLMTSLPL (see S402) at vehicle speed and gradient and the power generation electric power requirement lower limit value PGENLMTSOCL (see S403) at air conditioning and remaining capacity is set as the first power generation electric power limit value PGENLMTACHTRL (see S405 and S406), and the limiting process (see S409 and S410) of the lower limit value is performed, also taking into account the second power generation electric power limit value PGENLMTDEVL (see S408) which is based on the electric power consumption PWRDEV by an auxiliary device and the remaining capacity SOC.

Herein, as shown in FIG. 10B, the power generation output during limiting represented by the dashed curve (the power generator power generation output PREQGEN obtained by the process in step S27 in FIG. 2) is a high-selection from the power generation output during non-limiting (the power generator power generation output PREQGEN obtained in step S26 in FIG. 2) and the lower limit limiting value (the last power generation electric power limit value PWRGENLMTL in step S409 in FIG. 9).

Thus, even a structure provided with a power generator 16 with a low output (internal combustion engine 15 with a small displacement) can make a system robust against a rapid change in the driving load, and the energy budget can be maintained.

Further, as shown in FIG. 10B, in the medium/high speed region, the power generation output during limiting and the power generation output during non-limiting agree with each other. Thus, in a case that energy budget is established by normal basic cruising output power generation, such as a case of continuous descending on a hill or electricity storage state higher than an equilibrium state, as output limit is immediately released, it is possible to prevent a drop in the fuel economy caused by excessive power generation.

Third Embodiment
Power Unit

In the following, a power unit PU according to a third embodiment will be described. The entire configuration of the power unit PU in the third embodiment is similar to that of the power unit PU (see FIG. 1) in the first embodiment, and description will be omitted.

Operation Mode Determining Process

Figure 11:
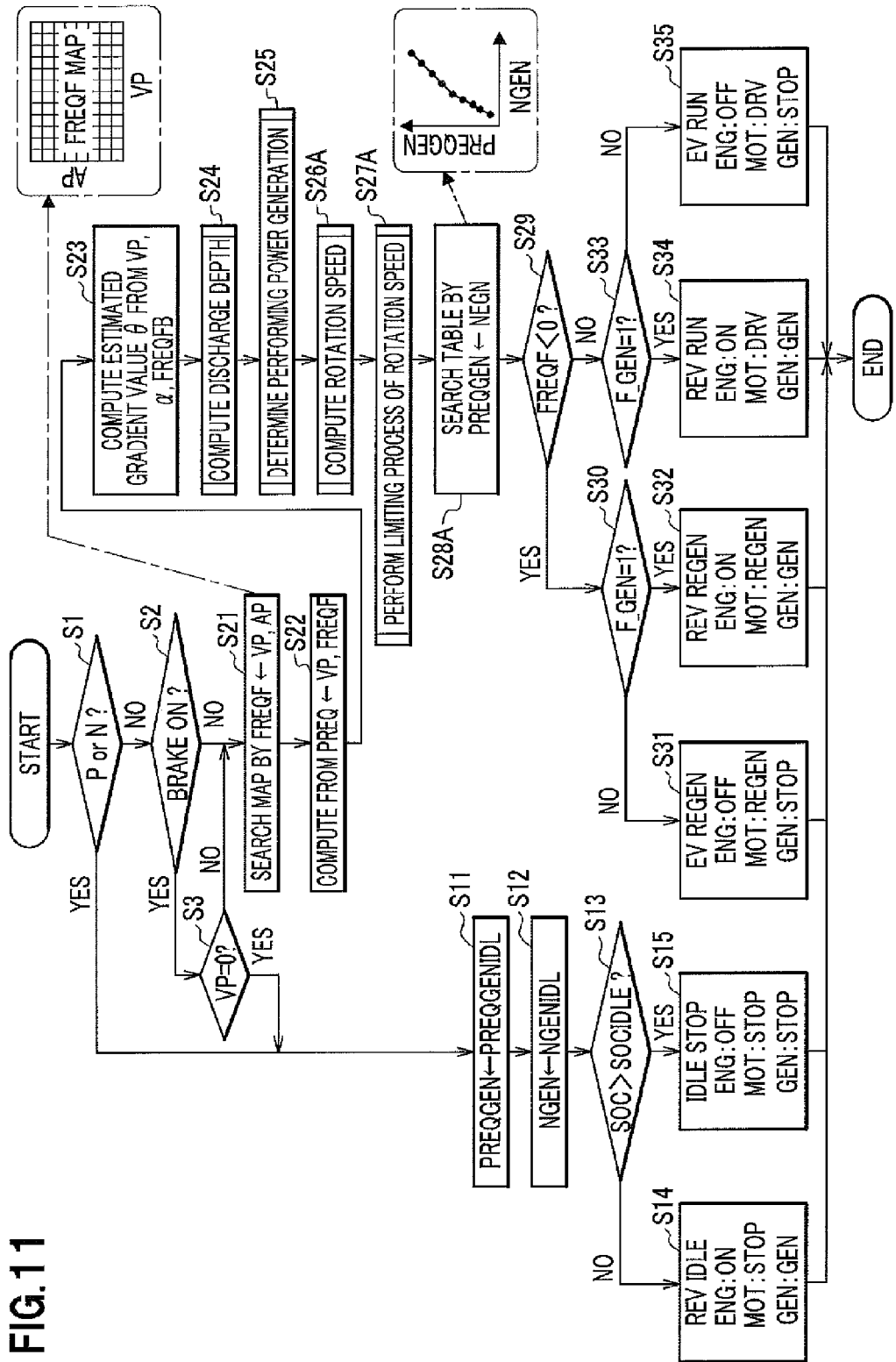
FIG. 11 is a flowchart of the operation mode determining process of a power unit in a third embodiment.

In the following, the operation mode determining process of the power unit PU in the third embodiment will be described, referring to FIG. 11. FIG. 11 is a flowchart of the operation mode determining process of a power unit PU in the third embodiment.

The operation mode determining process (see FIG. 2) in the first embodiment computes the power generator power generation output PREQGEN, which is the power generation amount of the power generator 16 (see step S26), performs the limiting process of the power generator power generation output PREQGEN (see step S27), and then obtains the rotation speed NGEN of the internal combustion engine for the power generator, which is the rotation speed of the internal combustion engine 15 (see step S28).

Unlike this, the operation mode determining process (see FIG. 11) in the third embodiment is different in that it computes the rotation speed NGEN of the internal combustion engine for the power generator, which is the rotation speed of the internal combustion engine 15 (see step S26A), performs the limiting process of the rotation speed NGEN of the internal combustion engine for the power generator (see step S27A), and then obtains the power generator power generation output PREQGEN, which is the power generation amount of the power generator 16 (see step S28A). The other processes (steps S1-S3, S11-S15, S21-25, and S29-S35) are similar to those of the operation mode determining process (see FIG. 2) in the first embodiment, and description of them will be omitted.

in step 26A, the controller 30 computes a rotation speed NGEN of the internal combustion engine for the power generator, which is the rotation speed of the internal combustion engine 15 (rotation speed computation). Details will be described later, referring to FIG. 12.

In step S27A, the controller 30 performs the limiting process of the rotation speed NGEN of the internal combustion engine for the power generator computed in step S26A (rotation speed limiting process). Details will be described later, referring to FIG. 13.

In step S28A, the controller 30 performs table searching for a power generator power generation output PREQGEN, which is the power generation amount of the power generator 16, based on the rotation speed NGEN of the internal combustion engine for the power generator obtained by the limiting process in step 27A (table searching by PREQGEN←NGEN). Incidentally, the table of power generator power generation output PREQGEN versus rotation speed NGEN of the internal combustion engine for the power generator is stored in the controller 30 in advance. This table is arranged such that, as shown in FIG. 11, the larger the rotation speed NGEN of the internal combustion engine for the power generator, the larger the power generator power generation output PREQGEN.

Rotation Speed Computing Process

Figure 12:
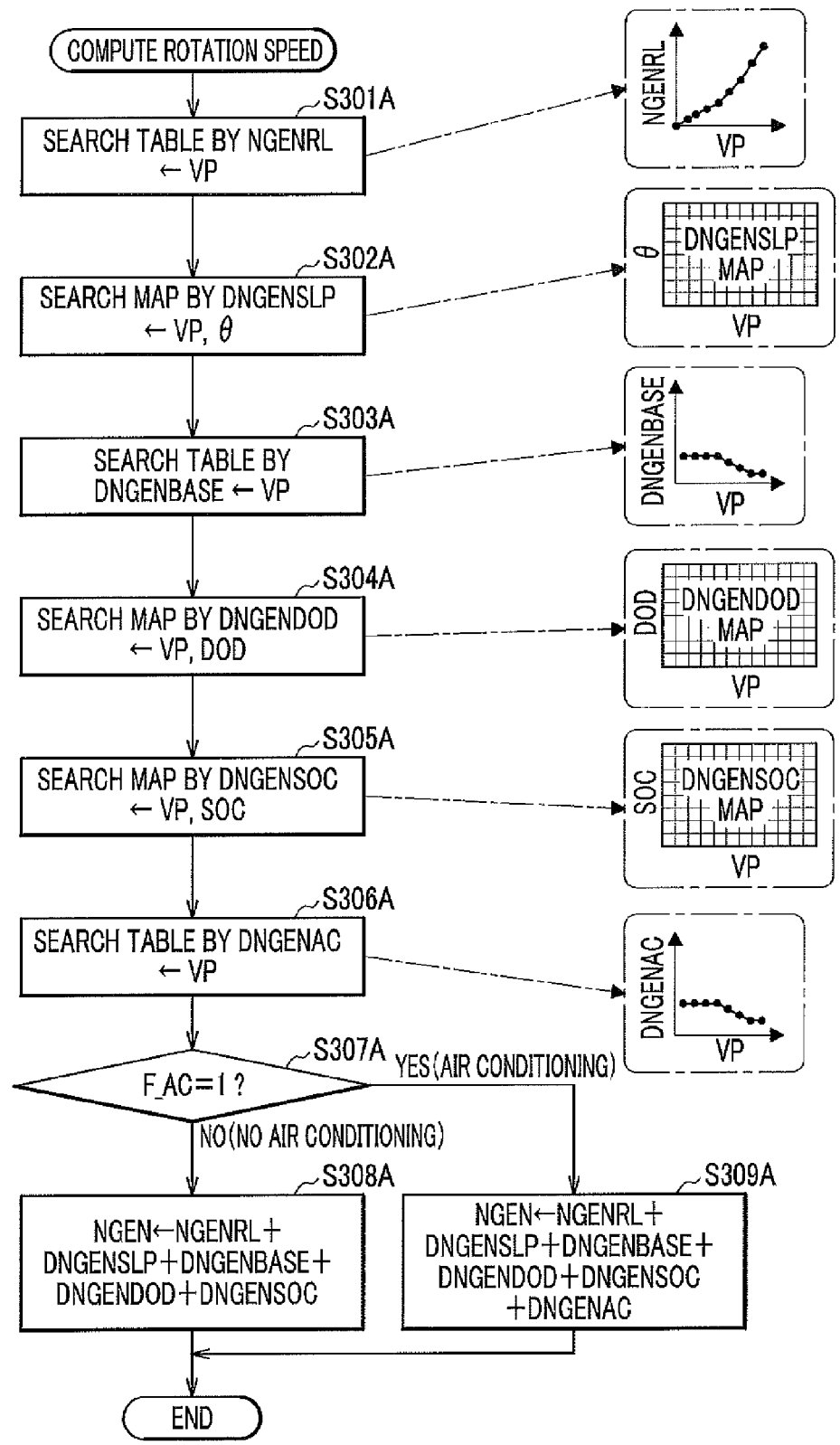
FIG. 12 is a flowchart of a rotation speed computing process in the third embodiment.

In the following, the rotation speed computing process in step S26A will be described, referring to FIG. 12. FIG. 12 is a flowchart of the rotation speed computing process in the third embodiment.

In step S301A, the controller 30 performs table searching for a basic rotation speed NGENRL of the internal combustion engine for the power generator corresponding to the output necessary for cruising at an individual vehicle speed (table searching by NGENRL←VP). Herein, the basic rotation speed NGENRL of the internal combustion engine for the power generator corresponding to the output necessary for cruising at an individual vehicle speed is the rotation speed of the internal combustion engine 15 for obtaining a power generation amount enabling the electric motor 14 to generate a driving force strong enough to overcome the air resistance Ra and the rolling resistance Rr of the vehicle. Incidentally, the table of basic rotation speed NGENRL of the internal combustion engine for the power generator corresponding to the output necessary for cruising at individual vehicle speed versus vehicle speed VP is stored in the controller 30 in advance. This table is arranged such that, as shown in FIG. 12, the higher the vehicle speed VP, the higher the basic rotation speed NGENRL of the internal combustion engine for the power generator corresponding to the output necessary for cruising at individual vehicle speed.

In step S302A, the controller 30 performs map searching for a power generation rotation speed correction amount DNGENSLP at an individual vehicle speed and gradient, based on the vehicle speed VP and the estimated gradient value θ (see step S23 in FIG. 11) (MAP searching by DNGENSLP←VP, θ). Incidentally, the map of power generation rotation speed correction amount DNGENSLP at individual vehicle speed and gradient versus vehicle speed VP and estimated gradient value θ is stored in the controller 30 in advance. The map of power generation rotation speed correction amount DNGENSLP at individual vehicle speed and gradient can be set such that, for example, the larger the estimated gradient value θ, the larger the power generation rotation speed correction amount DNGENSLP, and in case that the estimated gradient value θ is constant, the higher the vehicle speed VP, the smaller the power generation rotation speed correction amount DNGENSLP.

In step S303A, the controller 30 performs table searching for a power generation rotation speed add-on basic amount DNGENBASE at an individual vehicle speed, based on vehicle speed VP (table searching by DNGENBASE←VP). Incidentally, the table of power generation rotation speed add-on basic amount DNGENBASE at individual vehicle speed versus vehicle speed VP is stored in the controller 30 in advance. This table is arranged, as shown in FIG. 12, the higher the vehicle speed VP, the smaller the power generation rotation speed add-on basic amount DNGENBASE at individual vehicle speed.

In step S304A, the controller 30 performs map searching for a power generation rotation speed add-on amount DNGENDOD at an individual vehicle speed and discharge depth, based on the vehicle speed VP and the discharge depth DOD (MAP searching by DNGENDOD←VP, DOD). Incidentally, the map of power generation rotation speed add-on amount DNGENDOD at individual vehicle speed and discharge depth versus vehicle speed VP and discharge depth DOD is stored in the controller 30 in advance. The map of power generation rotation speed add-on amount DNGENDOD at individual vehicle speed and discharge depth can be set such that, for example, the larger the discharge depth DOD, the larger the power generation rotation speed add-on amount DNGENDOD, and in case that the discharge depth DOD is constant, the higher the vehicle speed VP, the smaller the power generation rotation speed add-on amount DNGENDOD.

In step S305A, the controller 30 performs map searching for a power generation rotation speed add-on amount DNGENSOC at an individual vehicle speed and remaining capacity, based on the vehicle speed VP and the remaining capacity SOC (MAP searching by DNGENSOC←VP, SOC). Incidentally, the map of power generation rotation speed add-on amount DNGENSOC at individual vehicle speed and remaining capacity versus the vehicle speed VP and the remaining capacity SOC is stored in the controller 30 in advance. The map of power generation rotation speed add-on amount DNGENSOC at individual vehicle speed and remaining capacity can be set such that, for example, the smaller the remaining capacity SOC, the larger the power generation rotation speed add-on amount DNGENSOC, and in case that the remaining capacity SOC is constant, the higher the vehicle speed VP, the smaller the power generation rotation speed add-on amount DNGENSOC.

In step S306A, the controller 30 performs table searching for a power generation rotation speed add-on amount DNGENAC during usage of air conditioning at an individual vehicle speed, based on the vehicle speed VP (table searching by DNGENAC←VP). Incidentally, the map of power generation rotation speed add-on amount DNGENAC during usage of air conditioning at individual vehicle speed versus vehicle speed VP is stored in the controller 30 in advance. This table is arrange such that, as shown in FIG. 12, as the vehicle speed VP becomes higher, the power generation rotation speed add-on amount DNGENAC during usage of air conditioning at an individual vehicle speed decreases.

In step S307A, the controller 30 determines whether or not the air conditioner using flag F_AC is '1' (air conditioning device used) (F_AC=1?) Incidentally, the air-conditioning ECU 36 is arranged such as to set the air conditioning using flag F_AC to '1' (air conditioning device used) when the electric compressor 18 and/or the electric heater 19 is/are in operation, and sets the air conditioner using flag F_AC to '0' (air conditioning device not used) when neither the electric compressor 18 nor the electric heater 19 is in operation. If the air conditioner using flag F_AC is '1' (air conditioner device used) (S307A Yes), then the process by the controller 30 proceeds to step S309A. On the other hand, if the air conditioner using flag F_AC is not '1' (air conditioner device used) (S307A No), then the process by the controller 30 proceeds to step S308A.

In step S308A, the controller 30 sets a rotation speed NGEN of the internal combustion engine for the power generator, which is the rotation speed of the internal combustion engine 15, to a value obtained by adding the basic rotation speed NGENRL of the internal combustion engine for the power generator corresponding to the output necessary for cruising at an individual vehicle speed (see S301A), the power generation rotation speed correction amount DNGENSLP at an individual vehicle speed and gradient (see S302A), the power generation rotation speed add-on basic amount DNGENBASE at an individual vehicle speed (see S303A), the power generation rotation speed add-on amount DNGENDOD at individual vehicle speed and discharge depth (see S304A), and the power generation rotation speed add-on amount DNGENSOC at an individual vehicle speed and remaining capacity (see S305A). Then, the rotation speed computing process (step S26A) is terminated, and the process proceeds to step S27A (see FIG. 11).

In step S309A, the controller 30 sets a rotation speed NGEN of the internal combustion engine for the power generator, which is the rotation speed of the internal combustion engine 15, to a value obtained by adding the basic rotation speed NGENRL of the internal combustion engine for the power generator corresponding to the output necessary for cruising at an individual vehicle speed (see S301A), the power generation rotation speed correction amount DNGENSLP at an individual vehicle speed and gradient (see S302A), the power generation rotation speed add-on basic amount DNGENBASE at an individual vehicle speed (see S303A), the power generation rotation speed add-on amount DNGENDOD at individual vehicle speed and discharge depth (see S304A), the power generation rotation speed add-on amount DNGENSOC at an individual vehicle speed and remaining capacity (see S305A), and the power generation rotation speed add-on amount DNGENAC during usage of air conditioning at an individual vehicle speed (see S306A). Then, the rotation speed computing process (step S26A) is terminated, and the process proceeds to step S27A (see FIG. 11).

Rotation Speed Limiting Process (Upper Limit Value)

Figure 13:
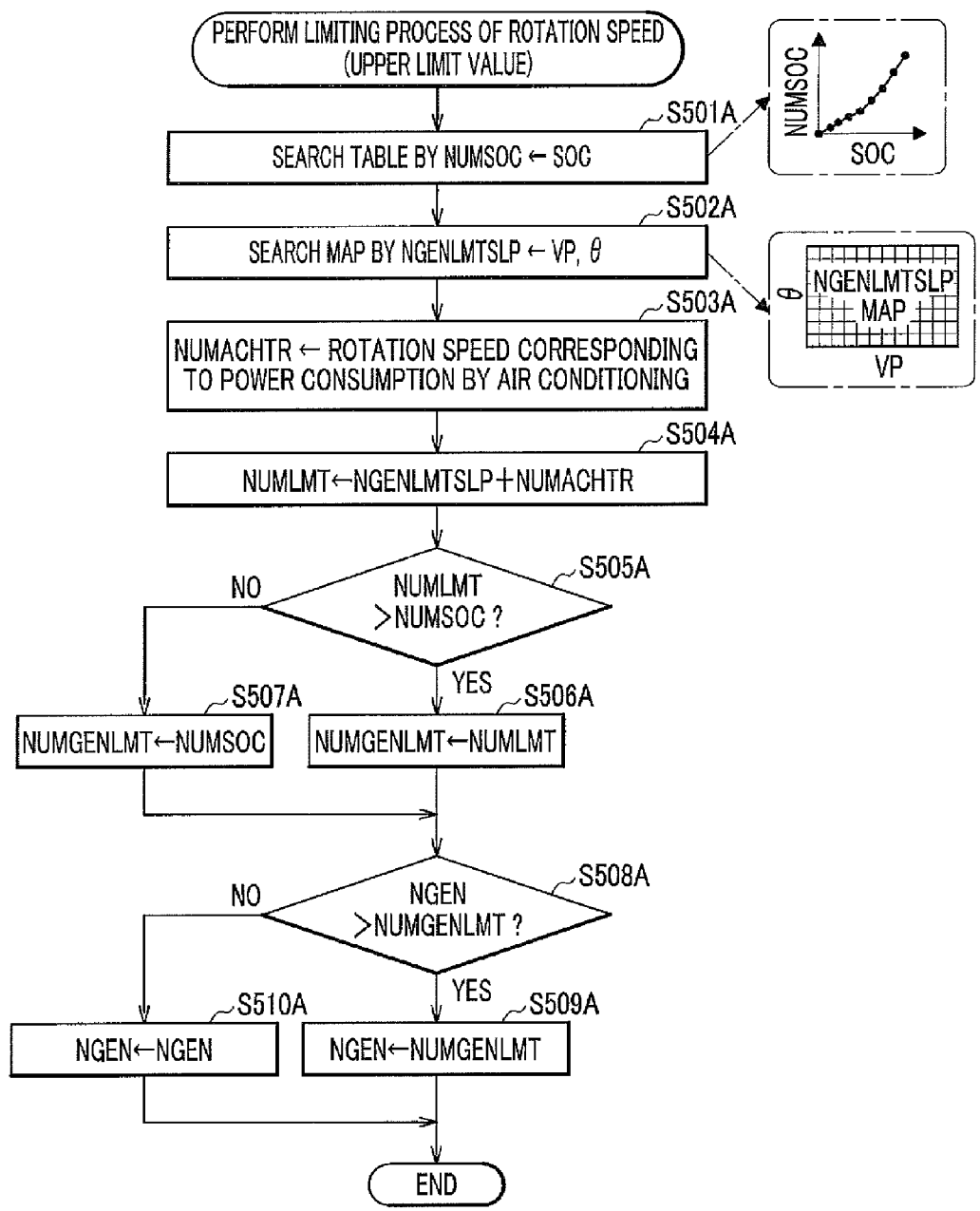
FIG. 13 is a flowchart of a rotation speed limiting process (upper limit value) in the third embodiment.

In the following, a rotation speed limiting process (upper limit value) in step S27A will be described, referring to FIG. 13. FIG. 13 is a flowchart of a rotation speed limiting process (upper value limit) in the third embodiment.

In step S501A, the controller 30 performs table searching for a rotation speed NUMSOC corresponding to the upper limit output in the BSFC best region, based on the remaining capacity SOC of the storage battery 11 (table searching by NUMSOC←SOC). Incidentally, the table of rotation speed NUMSOC corresponding to the upper limit output in the BSFC best region versus remaining capacity SOC is stored in the controller 30 in advance. This table is arranged such that, as shown in FIG. 13, the larger the remaining capacity SOC, the higher the rotation speed NUMSOC corresponding to the upper limit output in the BSFC best region.

In step S502A, the controller 30 performs map searching for a power generation rotation speed requirement upper limit value NGENLMTSLP at vehicle speed and gradient, based on the vehicle speed VP and the estimated gradient value θ of a road surface (see step S23 in FIG. 11) (MAP searching by NGENLMTSLP←VP, θ). Incidentally, the map of power generation rotation speed requirement upper limit value NGENLMTSLP at vehicle speed and gradient versus vehicle speed VP and estimated gradient value θ is stored in the controller 30 in advance. The map of power generation rotation speed requirement upper limit value NGENLMTSLP at vehicle speed and gradient can be set such that, for example, the larger the estimated gradient value θ, the larger the power generation rotation speed requirement upper limit value NGENLMTSLP; and the higher the vehicle speed VP, the larger the power generation rotation speed requirement upper limit value NGENLMTSLP.

In step S503A, the controller 30 inputs and sets a rotation speed NUMACHTR corresponding to electric power consumption by air conditioning (NUMACHTR←rotation speed corresponding to electric power consumption by air conditioning). Herein, if no air conditioning device (electric compressor 18, electric heater 19) is currently used, the rotation speed NUMACHTR corresponding to electric power consumption by air conditioning is set to '0', and if an air conditioning device/devices (electric compressor 18, electric heater 19) is/are currently used, the rotation speed NUMACHTR corresponding to electric power consumption by air conditioning is set to the rotation speed of the internal combustion engine 15 for obtaining the electric power for maximum electric power consumption by the air conditioning device/devices (total if plural). Or, the electric power consumption of the air conditioning device/devices (electric compressor 18, electric heater 19) may be estimated to thereby obtain the rotation speed of the internal combustion engine 15 for obtaining the electric power for the electric power consumption.

In step S504, the controller 30 sets a power generation rotation speed requirement upper limit value NUMLMT defined by air conditioning and gradient to a value obtained by adding the power generation rotation speed requirement upper limit value NGENLMTSLP (see S502A) at vehicle speed and gradient, and the rotation speed NUMACHTR (see S503A) corresponding to electric power consumption by air conditioning (NUMLMT←NGENLMTSLP+NUMACHTR).

In step S505A, the controller 30 determines whether or not the power generation rotation speed requirement upper limit value NUMLMT (see S504A) defined by air conditioning and gradient is greater than the rotation speed NUMSOC (see S501A) corresponding to the upper limit output in the BSFC best region (NUMLMT>NUMSOC?) If the power generation rotation speed requirement upper limit value NUMLMT defined by air conditioning and gradient is greater than the rotation speed NUMSOC corresponding to the upper limit output in the BSFC best region (S505A Yes), the process by the controller 30 proceeds to step S506A. On the other hand, If the power generation rotation speed requirement upper limit value NUMLMT defined by air conditioning and gradient is not greater than the rotation speed NUMSOC corresponding to the upper limit output in the BSFC best region (S505A No), the process by the controller 30 proceeds to step S507A In step S506A, the controller 30 sets a final power generation rotation speed limit value NUMGENLMT to the power generation rotation speed requirement upper limit value NUMLMT (see S504A) defined by air conditioning and gradient (NUMGENLMT←NUMLMT). Then, the process by the controller 30 proceeds to step S508A.

In step 507A, the controller 30 sets a final power generation rotation speed limit value NUMGENLMT to the rotation speed NUMSOC (see S501A) corresponding to the upper limit output in the BSFC best region (NUMGENLMT←NUMSOC). Then, the process by the controller 30 proceeds to step S508A.

In step 508A, the controller 30 determines whether or not the rotation speed NGEN (see S308A and S309A in FIG. 12) of the internal combustion engine for the power generator is greater than the final power generation rotation speed limit value NUMGENLMT (see S506A and 507A) (NGEN>NUMGENLMT?) If the rotation speed NGEN of the internal combustion engine for the power generator is greater than the final power generation rotation speed limit value NUMGENLMT (S508A Yes), then the process by the controller 30 proceeds to step S509A. On the other hand, if the rotation speed NGEN of the internal combustion engine for the power generator is not greater than the final power generation rotation speed limit value NUMGENLMT (S508A No), then the process by the controller 30 proceeds to step S510A.

In step S509A, the controller 30 sets the internal combustion engine rotation speed NGEN for the power generator to the final power generation rotation speed limit value NUMGENLMT (NGEN←NUMGENLMT). Then, the rotation speed limiting process (step S27A) is terminated, and the process proceeds to step S28A (see FIG. 11).

In step S510A, the controller 30 sets the internal combustion engine rotation speed NGEN for the power generation to the internal combustion engine rotation speed NGEN for the power generator (NGEN←NGEN). Then, the rotation speed limiting process (step S27A) is terminated, and the process proceeds to step S28A (see FIG. 11).

In such a manner, also in the process of the power unit PU in the third embodiment, operation and effects similar to those in the process of the power unit PU in the first embodiment can be obtained.

Fourth Embodiment

Power Unit

In the following, a power unit PU in a fourth embodiment will be described. The entire configuration of the power unit PU in the fourth embodiment is similar to that of the power unit PU (see FIG. 1) in the first embodiment, and description will be omitted.

Operation Mode Determining Process

In the following, the operation mode determining process (see FIG. 11) of the power unit PU in the fourth embodiment will be described. In step S27A in FIG. 11, the controller 30 of the power unit PU in the third embodiment or the fourth embodiment performs a limiting process of the internal combustion engine rotation speed NGEN for the power generator computed in step S206A (rotation speed limiting process). Herein, the rotation speed limiting process in the third embodiment is 'the rotation speed limiting process (upper limit value)' shown in FIG. 13. Unlike this, the power generation amount limiting process in the fourth embodiment is different in that it is 'the rotation speed limiting process (lower limit value)' shown in FIG. 14. Other points are similar, and description will be omitted.

Rotation Speed Limiting Process (Lower Limit Value)

In the following, the rotation speed limiting process (lower limit value) in step S27A will be described, referring to FIG. 14. FIG. 14 is the flowchart of the rotation speed limiting process (lower value limit) in the fourth embodiment.

In step S401A, the controller 30 sets an rotation speed NUMACHTR corresponding to electric power consumption by air conditioning (NUMACHTR←rotation speed corresponding to electric power consumption by air conditioning). Herein, if no air conditioning device (electric compressor 18, electric heater 19) is currently used, the rotation speed NUMACHTR corresponding to electric power consumption by air conditioning is set to '0', and if an air conditioning device/devices (electric compressor 18, electric heater 19) is/are currently used, the rotation speed NUMACHTR corresponding to electric power consumption by air conditioning is set to the rotation speed of the internal combustion engine 15 by which the electric power for the maximum electric power consumption (total if plural) of the air conditioning device/devices can be obtained. Or, the rotation speed of the internal combustion engine 15 for obtaining the electric power for the electric power consumption may be obtained by estimating the electric power consumption of the air conditioner (electric compressor 18, electric heater 19).

In step S402A, the controller 30 performs map searching for a power generation rotation speed requirement lower limit value NGENLMTSLPL at vehicle speed and gradient, based on the vehicle speed VP and the estimated gradient value θ (see step S23 in FIG. 11) (MAP searching by NGENLMTSLPL←VP, θ). Incidentally, the map of power generation rotation speed requirement lower limit value NGENLMTSLPL at vehicle speed and gradient versus vehicle speed VP and estimated gradient value θ is stored in the controller 30 in advance. The map of power generation rotation speed requirement lower limit value NGENLMTSLPL at vehicle speed and gradient can be set such that, for example, the larger the estimated gradient value θ, the larger the power generation rotation speed requirement lower limit value NGENLMTSLPL; and the higher the vehicle speed VP, the larger the power generation rotation speed requirement lower limit value NGENLMTSLPL.

In step S403A, the controller 30 performs map searching for a power generation rotation speed requirement lower limit value NGENLMTSOCL at air conditioning and remaining capacity, based on the rotation speed NUMACHTR (see S401A) corresponding to electric power consumption by air conditioning and the remaining capacity SOC of the storage battery 11 (MAP searching by NGENLMTSOCL←NUMACHTR and SOC). Incidentally, the map of power generation rotation speed requirement lower limit value NGENLMTSOCL at air conditioning and remaining capacity versus the rotation speed NUMACHTR corresponding to electric power consumption by air conditioning and the remaining capacity SOC is stored in the controller 30 in advance. The map of power generation rotation speed requirement lower limit value NGENLMTSOCL at air conditioning and remaining capacity can be set such that, for example, the higher the electric power consumption by air conditioning, the larger the power generation rotation speed requirement lower limit value NGENLMTSOCL; and the larger the remaining capacity SOC, the larger the power generation rotation speed requirement lower limit value NGENLMTSOCL.

In step S404A, the controller 30 determines whether or not the power generation rotation speed requirement lower limit value NGENLMTSLPL (see S402) at vehicle speed and gradient is greater than the power generation rotation speed requirement lower limit value NGENLMTSOCL (see S403A) at air conditioning and remaining capacity (NGENLMTSLPL>NGENLMTSOCL?) If the power generation rotation speed requirement lower limit value NGENLMTSLPL at vehicle speed and gradient is greater than the power generation rotation speed requirement lower limit value NGENLMTSOCL at air conditioning and remaining capacity (S404A Yes), then the process by the controller 30 proceeds to step 405A. On the other hand, if the power generation rotation speed requirement lower limit value NGENLMTSLPL at vehicle speed and gradient is not greater than the power generation rotation speed requirement lower limit value NGENLMTSOCL at air conditioning and remaining capacity (S404A No), then the process by the controller 30 proceeds to step 406A.

In step S405A, the controller 30 sets a first power generation rotation speed limit value NGNLMTCHTRL to the power generation rotation speed requirement lower limit value NGENLMTSLPL (see S402A) at vehicle speed and gradient (NGENLMTACHTRL←NGENLMTSLPL). Then, the process by the controller 30 proceeds to step S407A.

In step S406A, the controller 30 sets a first power generation rotation speed limit value NGENLMTACHTRL to the power generation rotation speed requirement lower limit value NGENLMTSOCL (see S403A) at air conditioning and remaining capacity (NGENLMTACHTRL←NGENLMTSOCL). Then, the process by the controller 30 proceeds to step S407A.

In step S407A, the controller 30 inputs and sets a rotation speed NUMDEV corresponding to electric power consumption by an auxiliary device (NUMDEV←rotation speed corresponding to electric power consumption by auxiliary device). Herein, if no auxiliary device is currently used, the rotation speed NUMDEV corresponding to electric power consumption by an auxiliary device is set to '0', and if an auxiliary device/deices is/are currently used, the rotation speed NUMDEV corresponding to electric power consumption by an auxiliary device/devices is set to the rotation speed of the internal combustion engine 15 for obtaining the electric power for the maximum electric power consumption (total if plural) of the auxiliary device/devices.

In step S408A, the controller 30 performs map searching for a power generation rotation speed limit value NGENLMTDEVL, based on the rotation speed NUMDEV (see S407A) corresponding to electric power consumption by an auxiliary device and the remaining capacity SOC of the storage battery 11 (MAP searching by NGENLMTDEVL←NUMDEV and SOC). Incidentally, the map of the second power generation rotation speed limit value NGENLMTDEVL versus rotation speed NUMDEV corresponding to electric power consumption by an auxiliary device/devices and remaining capacity SOC is stored in the controller 30 in advance. The map of the second power generation rotation speed limit value NGENLMTDEVL can be set such that, for example, the higher the electric power consumption PWRDEV by an auxiliary device/devices, the larger the second power generation rotation speed limit value NGENLMTDEVL; and the larger the remaining capacity SOC, the larger the second power generation rotation speed limit value NGENLMTDEVL.

In step S409A, the controller 30 sets a final power generation rotation speed limit value NUMGENLMTL to a value obtained by adding the first power generation rotation speed limit value NGENLMTACHTRL (see S405A and S406A) and the second power generation rotation speed limit value NGENLMTDEVL (see S409A) (NUMGENLMTL←NGENLMTACHTRL+NGENLMTDEVL).

In step 410A, the controller 30 determines whether or not the rotation speed NGEN of the internal combustion engine for the power generator (see S308A and S309A in FIG. 12) is greater than the final power generation rotation speed limit value NUMGENLMTL (see S409A) (NGEN>NUMGENLMTL?) If the rotation speed NGEN of the internal combustion engine for the power generator is greater than the final power generation rotation speed limit value NUMGENLMTL (S410A Yes), the process by the controller 30 proceeds to step S411A. On the other hand, if the rotation speed NGEN of the internal combustion engine for the power generator is not greater than the final power generation rotation speed limit value NUMGENLMTL (S410A No), the process by the controller 30 proceeds to step S412A.

In step S411A, the controller 30 sets the rotation speed NGEN of the internal combustion engine for the power generator to the rotation speed NGEN of the internal combustion engine for the power generator (NGEN←NGEN). Then, the rotation speed limiting process (step S27A) is terminated, and the process proceeds step S28A (see FIG. 11).

In step S412A, the controller 30 sets the rotation speed NGEN of the internal combustion engine for the power generator to the final power generation rotation speed limit value NUMGENLMTL (NGEN←NUMGENLMTL). Then, the rotation speed limiting process (step S27A) is terminated, and the process proceeds to step S28A (see FIG. 11).

In such a manner, also in the process of the power unit PU in the fourth embodiment, operation and effects similar to those in the process of the power unit PU in the first embodiment can be obtained.

Modified Example

Incidentally, a power unit PU (power generation control device) in an embodiment of the invention is not limited to the arrangement in the foregoing embodiments, and various changes and modification can be made within a range without departing from the spirit of the invention.

The power unit PU (controller 30) in an embodiment of the invention has been described such that, regarding the power generation amount limiting process in step S27 in FIG. 2, the power generation amount limiting process in the first embodiment is the limiting process (see FIG. 6) of the upper limit of the power generation amount (power generator power generation output PREQGEN), and the power generation amount limiting process in the second embodiment is the limiting process (see FIG. 9) of the lower limit of the power generation amount (power generator power generation output PREQGEN), however, the invention is not limited thereto.

The power generation amount limiting process (see step S27 in FIG. 2) may be arranged such that the limiting process (see FIG. 6) is performed on the upper limit of the power generation amount (power generator power generation output PREQGEN), and further, the limiting process (see FIG. 9) is performed on the lower limit of the power generation amount (power generator power generation output PREQGEN).

Further, the power unit PU (controller 30) in an embodiment of the invention has been described such that, regarding the rotation speed limiting process in step S27A in FIG. 11, the limiting process (see FIG. 13) in the third embodiment is performed on the upper limit of the rotation speed (the rotation speed NGEN of the internal combustion engine for the power generator), and the limiting process (see FIG. 14) in the fourth embodiment is performed on the lower limit of the rotation speed (the rotation speed NGEN of the internal combustion engine for the power generator), however, the invention is not limited thereto.

Regarding the rotation speed limiting process (see step S27A in FIG. 11), arrangement may be made such that the upper limit of the rotation speed (the rotation speed NGEN of the internal combustion engine for the power generator) is subjected to the limiting process (see FIG. 13), and the lower limit of the rotation speed (the rotation speed NGEN of the internal combustion engine for the power generator) is subjected to the limiting process (see FIG. 14).

Thus, while satisfying the requirement from a driver (namely, the required driving force of the electrical motor), the operation efficiency of the internal combustion engine can be improved. Further, it is possible to improve the fuel economy and reduce sounds and vibration generated by the internal combustion engine.

The respective maps and respective tables of the power unit PU in the foregoing embodiments are an example, and the invention is not limited thereto.

The vehicle (hybrid vehicle) on which the power unit PU is mounted may be one whose electric motor 14 drives either the front wheels or the rear wheels. Further, plural, two for example, electric motors 14 may be arranged such that the first electrical motor drives front wheels, and the second electrical motor drives rear wheels.

Further, a hybrid vehicle having the power unit PU (power generation control device) in an embodiment of the invention has been described as a series type, as shown in FIG. 1, however, without being limited thereto, the power unit PU can also be applied to a hybrid vehicle allowing a series type and a parallel type.

DESCRIPTION OF REFERENCE SYMBOLS

PU . . . power unit (power generation control device)
S . . . auxiliary movement power section
11 . . . storage battery
12 . . . first convertor
13 . . . first power drive unit
14 . . . electric motor
15 . . . internal combustion engine
16 . . . power generator
17 . . . second power drive unit
18 . . . electric compressor (temperature controlling means)
19 . . . electric heater (temperature adjusting means)
20 . . . second convertor
21 . . . low-voltage storage battery
22 . . . charging device
23 . . . external charging plug
30 . . . controller

The invention claimed is:

1. A power generation control device, comprising:
a power generator driven by an internal combustion engine;
a storage battery for storing electric power generated by the power generator; and
a controller for controlling the internal combustion engine and the power generator,
wherein the controller is arranged such that:
the controller determines whether or not to permit the power generator to generate power, depending on a state of the storage battery;
if the controller permits power generation, then the controller sets a power generation amount that corresponds to an output that is necessary, for cruising, corresponding to a driving state, and sets an add-on power generation amount that corresponds to an electric power amount that is necessary corresponding to a vehicle state and the driving state;
if total of the power generation amount and the add-on power generation amount is higher than a maximum power generation amount, the controller controls the internal combustion engine and the power generator, based on the maximum power generation amount; and
if the total of the power generation amount and the add-on power generation amount is lower than or equal to the maximum power generation amount, the controller controls the internal combustion engine and the power generator, based on the total of the power generation amount and the add-on power generation amount.

2. The power generation control device according to claim 1,
wherein the controller derives the maximum power generation amount, based on a remaining capacity of the storage battery.

3. The power generation control device according to claim 1,
wherein the controller derives the maximum power generation amount, based on an estimated gradient value of a road surface.

4. The power generation control device according to claim 1, comprising:
   temperature adjusting means operated by electric power from the storage battery,
   wherein the controller derives the maximum power generation amount, corresponding to an operation state of the temperature adjusting means.

5. A power generation control device, comprising:
   a power generator driven by an internal combustion engine;
   a storage battery for storing electric power generated by the power generator; and
   a controller for controlling the internal combustion engine and the power generator,
   wherein the controller is arranged such that:
   the controller determines whether or not to permit the power generator to generate power, depending on a state of the storage battery;
   if the controller permits power generation, then the controller sets a power generation amount that corresponds to an output that is necessary, for cruising, corresponding to a driving state, and sets an add-on power generation amount that corresponds to an electric power amount that is necessary corresponding to a vehicle state and the driving state;
   if total of the power generation amount and the add-on power generation amount is lower than a minimum power generation amount, the controller controls the internal combustion engine and the power generator, based on the minimum power generation amount; and
   if the total of the power generation amount and the add-on power generation amount is higher than or equal to the minimum power generation amount, the controller controls the internal combustion engine and the power generator, based on the total of the power generation amount and the add-on power generation amount.

6. The power generation control device according to claim 5,
   wherein the controller derives the minimum power generation amount, based on a remaining capacity of the storage battery.

7. The power generation control device according to claim 5,
   wherein the controller derives the minimum power generation amount, based on an estimated gradient value of a road surface.

8. The power generation control device according to claim 5, comprising:
   temperature adjusting means operated by electric power from the storage battery,
   wherein the controller derives the minimum power generation amount, corresponding to an operation state of the temperature adjusting means.

9. A power generation control device, comprising:
   a power generator driven by an internal combustion engine;
   a storage battery for storing electric power generated by the power generator; and
   a controller for controlling the internal combustion engine and the power generator,
   wherein the controller is arranged such that:
   the controller determines whether or not to permit the power generator to generate power, depending on a state of the storage battery;
   if the controller permits power generation, then the controller sets a rotation speed of the internal combustion engine that enables the power generator to generate power that corresponds to an output that is necessary, for cruising, corresponding to a driving state, and sets an add-on rotation speed of the internal combustion engine to enable the power generator to generate power corresponding to an electric power amount that is necessary corresponding to a vehicle state and the driving state;
   if total of the rotation speed of the internal combustion engine and the add-on rotation speed of the internal combustion engine is higher than a maximum rotation speed of the internal combustion engine, the controller controls the internal combustion engine and the power generator, based on the maximum rotation speed of the internal combustion engine; and
   if the total of the rotation speed of the internal combustion engine and the add-on rotation speed of the internal combustion engine is lower than or equal to the maximum rotation speed of the internal combustion engine, the controller controls the internal combustion engine and the power generator, based on the rotation speed of the internal combustion engine and the add-on rotation speed of the internal combustion engine.

10. The power generation control device according to claim 9,
    wherein the controller derives the maximum rotation speed of the internal combustion engine, based on a remaining capacity of the storage battery.

11. The power generation control device according to claim 9,
    wherein the controller derives the maximum rotation speed of the internal combustion engine, based on an estimated gradient value of a road surface.

12. The power generation control device according to claim 9, comprising:
    temperature adjusting means operated by electric power from the storage battery,
    wherein the controller derives the maximum rotation speed of the internal combustion engine, corresponding to an operation state of the temperature adjusting means.

13. A power generation control device, comprising:
    a power generator driven by an internal combustion engine;
    a storage battery for storing electric power generated by the power generator; and
    a controller for controlling the internal combustion engine and the power generator,
    wherein the controller is arranged such that:
    the controller determines whether or not to permit the power generator to generate power, depending on a state of the storage battery;
    if the controller permits power generation, then the controller sets a rotation speed of the internal combustion engine that enables the power generator to generate power corresponding to an output that is necessary for cruising corresponding to a driving state, and sets an add-on rotation speed of the internal combustion engine that enables the power generator to generate power that corresponds to an electric power amount that is necessary corresponding to a vehicle state and the driving state,
    if the total of the rotation speed of the internal combustion engine and the add-on rotation speed of the internal combustion engine is lower than a minimum rotation speed of the internal combustion engine, the controller controls the internal combustion engine and the power generator, based on the minimum rotation speed of the internal combustion engine; and
    if the total of the rotation speed of the internal combustion engine and the add-on rotation speed of the internal combustion engine is higher than or equal to the minimum rotation speed of the internal combustion engine, the controller controls the internal combustion engine and the power generator, based on the rotation speed of the internal combustion engine and the add-on rotation speed of the internal combustion engine.

14. The power generation control device according to claim 13,
    wherein the controller derives the minimum rotation speed of the internal combustion engine, based on a remaining capacity of the storage battery.

15. The power generation control device according to claim 13,
    wherein the controller derives the minimum rotation speed of the internal combustion engine, based on an estimated gradient value of a road surface.

16. The power generation control device according to claim 13, comprising temperature adjusting means operated by electrical power from the storage battery,
    wherein the controller derives the minimum rotation speed of the internal combustion engine, corresponding to an operation state of the temperature adjusting means.

\* \* \* \* \*